(12) United States Patent
Okada et al.

(10) Patent No.: US 6,300,416 B1
(45) Date of Patent: *Oct. 9, 2001

(54) RUBBER COMPOSITIONS FOR TIRES

(75) Inventors: Keiji Okada; Kenichi Morizono; Kazuyuki Takimoto; Tetsuhiro Matsumoto, all of Waki-cho; Masaaki Kawasaki; Tetsuo Tojo, both of Ichihara, all of (JP)

(73) Assignee: Mitsui Chemicals, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,863

(22) PCT Filed: Jan. 21, 1998

(86) PCT No.: PCT/JP98/00216

§ 371 Date: Sep. 17, 1998

§ 102(e) Date: Sep. 17, 1998

(87) PCT Pub. No.: WO98/31745

PCT Pub. Date: Jul. 23, 1998

(30) Foreign Application Priority Data

| Jan. 21, 1997 | (JP) | 9-008887 |
| Jan. 28, 1997 | (JP) | 9-013736 |
| Dec. 8, 1997 | (JP) | 9-337508 |
| Dec. 8, 1997 | (JP) | 9-356255 |

(51) Int. Cl.$^7$ ............... C08F 8/00; C08L 23/00; C08L 23/04; C08L 25/02; B60C 1/00
(52) U.S. Cl. ............... 525/191; 525/240; 525/241; 152/450; 152/525; 152/564
(58) Field of Search ............... 525/191, 240, 525/241; 152/450, 525, 564

(56) References Cited

U.S. PATENT DOCUMENTS

| 4,990,640 | 2/1991 | Tsutsui et al. . |
| 5,703,187 | 12/1997 | Timmers . |
| 6,040,407 | 3/2000 | Ishida et al. . |

FOREIGN PATENT DOCUMENTS

| 0246745 | 11/1987 | (EP) . |
| 0691354 | 1/1996 | (EP) . |
| 0718323 | 6/1996 | (EP) . |
| 0781788 | 7/1997 | (EP) . |
| 0893245 | 1/1999 | (EP) . |
| 770368 | 3/1995 | (JP) . |
| 8143712 | 8/1995 | (JP) . |
| 8134140 | 5/1996 | (JP) . |
| 9607681 | 3/1996 | (WO) . |

OTHER PUBLICATIONS

Patent Abstracts of Japan, Publication No. 07070368 A published Mar. 14, 1995.

Patent Abstracts of Japan, vol. 096, No. 010, Oct. 31, 1996 & JP 08 143712 A (Tosoh Corp), Jun. 4, 1996.

*Primary Examiner*—Nathan M. Nutter
(74) *Attorney, Agent, or Firm*—Sherman & Shalloway

(57) ABSTRACT

A rubber composition useful as a tire side wall or tire tread is formed from an unsaturated olefin copolymer (A) or (A') and diene rubber (B). Copolymers (A) and (A') are each obtained from (i) ethylene, (ii) aromatic vinyl compound, (iii) non-conjugated polyene, and, optionally (iv) alpha-olefin having at least 3 carbon atoms. When used in forming a tire side wall, copolymer (A) has a molar ratio of (i)/(iv) from 100/0 to 40/60; molar ratio of [((i)+(iv))/(ii)] from 98/2 to 60/40; an intrinsic viscosity, measured in decalin, at 135° C., from 1.0 to 6.0 dl/g; and iodine value from 10 to 50. For use in tire tread, copolymer (A'), has a molar ratio (i)/(iv) from 100/0 to 40/60; molar ratio [((i)+(iv)):(ii)] from 99/1 to 85/15. The weight ratio (A')/(B) is from 1/99 to 50/50. The compositions for tire side wall are characterized by excellent strength properties and bending fatigue resistance and low fuel consumption. The compositions for tire tread are characterized by superior strength properties, abrasion resistance and braking performance on wet road (wet ski resistance) and small rolling resistance.

21 Claims, No Drawings

RUBBER COMPOSITIONS FOR TIRES

CROSS-REFERENCE TO RELATED APPLICATIONS

This application is a §371 entry into the United States based on International Application PCT/JP98/00216, filed Jan. 21, 1998.

BACKGROUND OF THE INVENTION

1. Field of the Invention

The present invention relates to a rubber composition for a tire, and more particularly, a rubber composition suitable for a tire side wall and a rubber composition suitable for a tire tread.

2. Description of the Related Art

One role of a side wall part of a pneumatic tire said to be protection of a carcass part and relaxation of stress or strain of a tire tread part during driving, and especially, the role of a side wall part of a radial tire is more important than that of a bias tire. Properties required for the side wall part for the protection of a carcass part, include weather resistance, scratch resistance during driving on a bad road and adhesion to a carcass part. As a property of the side wall required for the relaxation of stress and strain of a tread part, bending resistance is mentioned. Namely, a pneumatic tire is required to have various properties as described above since it is used under various circumstances and conditions. Of the above-described properties, the scratch resistance, bending resistance and weather resistance are highly required in particular, since maintenance of roads has improved and tire life has been further increased with spreading popularity of radial tires.

On the other hand, there are problems described below from the viewpoint of appearance. Namely, since a diene rubber used in a tire side wall has insufficient weather resistance, an amine-based antioxidant, paraffin wax and the like have been added. However, a diene rubber compounded with an amine-based antioxidant or paraffin wax has problems that the amine-based antioxidant or paraffin wax bleeds out of the surface with a lapse of time and the surface discolors to red to lower commercial value, and the amine-based antioxidant or paraffin wax is diffused during driving and ozone cracks are formed on the surface of a tire, and the like. For a formulation with which an antioxidant and the like are not compounded, it is known to use of EPT having high ozone resistance. However, a tire side wall comprising this EPT and a diene rubber has to further be improved in strength properties.

To solve the above-described problems, a rubber composition comprising natural rubber and EPDM using peroxide vulcanization has also been developed. However, such a peroxide vulcanization provides poor crack growth resistance required as property of a tire side wall, and does not provide excellent bending resistance, and therefore, it should be further improved.

Therefore, there is still a need for a rubber material for a tire side wall, which is excellent in strength property and bending resistance and provides low fuel consumption.

Further, styrene/butadiene copolymer rubber is conventionally used as rubber for tire tread of an automobile (rubber for a tire tread part). However, a tire tread comprising as a rubber component solely styrene/butadiene copolymer rubber has problems such as rolling resistance is high and abrasion resistance is poor since impact resilience at from 50 to 70° C. is low, though braking ability on wet road surface (wet skid) is relatively excellent.

Therefore, as a rubber material for a tire tread of an automobile, a blend of styrene/butadiene copolymer rubber with natural rubber is generally used. However, there is desired a tire having excellent balance from viewpoints of safety and energy conservation, namely having high braking ability even on wet road surface, in addition to lower fuel consumption and abrasion resistance. The conventional blend of styrene/butadiene copolymer rubber with natural rubber can not satisfy these abilities.

As a rubber composition which can improve abrasion resistance of a tire and braking ability of an automobile under wet conditions and can lower rolling resistance, raw material rubber for a tire tread, comprising a blend of polybutadiene and halogen-containing polyisobutyrene/isoprene rubber is described in Japanese Patent Laid-Open Application (JP-A) No. 56-93738. However, even when the above-described blend is used, abrasion resistance, braking ability and rolling resistance are not satisfactory.

Therefore, a rubber material for a tire tread is required, which has excellent abrasion resistance equivalent to or more than that of natural rubber and is excellent in strength property, further, has more excellent braking property than that of natural rubber, and has low rolling resistance and can improve fuel consumption.

DISCLOSURE OF THE INVENTION

The rubber composition for a tire side wall of the present invention comprises (A) an unsaturated olefin copolymer prepared from
  (i) ethylene,
  (ii) an aromatic vinyl compound,
  (iii) a non-conjugated polyene, and optionally
  (iv) an α-olefin having 3 or more carbon atoms, in which the molar ratio [(i)/(iv)] of constituent units derived from ethylene (i) to constituent units derived from the α-olefin having 3 or more carbon atoms (iv) is in the range of from 100/0 to 40/60, the molar ratio [((i)+(iv))/(ii)] of the sum of constituent units derived from ethylene (i) and constituent units derived from the α-olefin having 3 or more carbon atoms (iv) to constituent units derived from the aromatic vinyl compound (ii) is in the range of from 98/2 to 60/40, the intrinsic viscosity [η] measured in decalin at 135° C. is in the range of from 1.0 to 6.0 dl/g, and the iodine number is in the range of from 10 to 50; and (B) a diene rubber.

In the present invention, the above-described (ii) aromatic vinyl compound is preferably an aromatic vinyl compound represented by the following general formula (I).

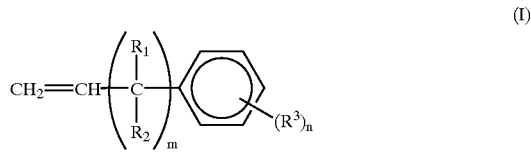

(I)

wherein $R^1$ and $R^2$ may be the same or different and are each a hydrogen atom or an alkyl group of 1 to 8 carbon atoms; $R_3$ is an alkyl group having 1 to 8 carbon atoms, alkoxy group, carboxyl group, acyloxy group, acyloxy-substituted alkyl group, hydroxyl group or halogen atom; m is an integer of from 0 to 5; and n is an integer of from 0 to 2.

The rubber composition for a tire side wall of the present invention may further comprise (C) carbon black and/or (D)

a vulcanizing agent in addition to the above-described unsaturated olefin copolymer (A) and the diene rubber (B).

In the rubber composition for a tire side wall of the present invention, it is preferable that the content of the unsaturated olefin copolymer (A) is from 20 to 80 parts by weight and the content of the diene rubber (B) is from 20 to 80 parts by weight based on 100 parts by weight of the total amount of the above-described unsaturated olefin copolymer (A) and the diene rubber (B).

In the present invention, as the above-described non-conjugated polyene (iii), there can be mentioned at least one non-conjugated triene or tetraene selected from compounds represented by the following general formula (II-a) wherein constituent units derived from said non-conjugated polyene are represented by the following general formula (II-b) and compounds represented by the following general formula (III-a) wherein constituent units derived from said non-conjugated polyene are represented by the following general formula (III-b).

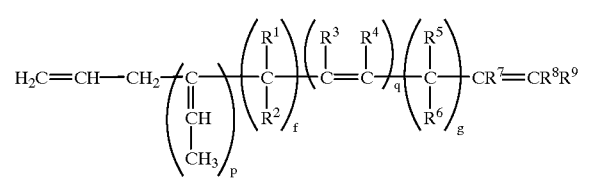
(II-a)

wherein p and q may be the same as or different from each other, and are each 0 or 1, with the proviso that each of p and q is not 0 at the same time; f is an integer of 0 to 5, with the proviso that f is not 0 when p and q are each 1; g is an integer of 1 to 6; $R^1$, $R^2$, $R^3$, $R^4$, $R^5$, $R^6$ and $R^7$ may be the same or different and are each a hydrogen atom or an alkyl group of 1 to 5 carbon atoms; $R^8$ is a hydrogen atom or an alkyl group of 1 to 5 carbon atoms; and $R^9$ is a hydrogen atom, an alkyl group of 1 to 5 carbon atoms or a group represented by —$(CH_2)_n$—$CR^{10}$=$CR^{11}R^{12}$ (n is an integer of 1 to 5, $R^{10}$ and $R^{11}$ may be the same or different and are each a hydrogen atom or an alkyl group of 1 to 5 carbon atoms, and $R^{12}$ is an alkyl group of 1 to 5 carbon atoms), with the proviso that when p and q are each 1, $R^9$ is a hydrogen atom or an alkyl group of 1 to 5 carbon atoms.

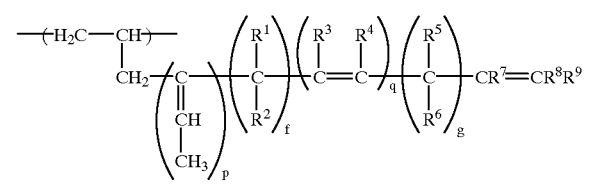
(II-b)

wherein p, q, f, g, and $R^1$ to $R^9$ have the same meanings as in the formula (II-a).

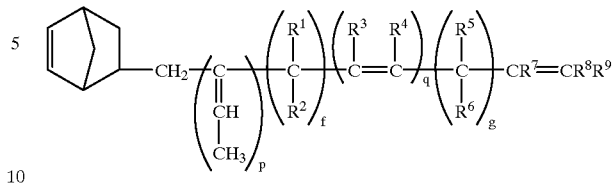
(III-a)

wherein p, q, f, g, and $R^1$ to $R^9$ have the same meanings as in the formula (II-a).

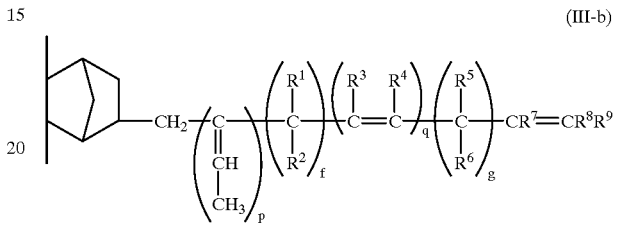
(III-b)

wherein p, q, f, g, and $R^1$ to $R^9$ have the same meanings as in the formula (II-a).

The non-conjugated triene or tetraene represented by the general formula (II-a) is preferably a compound represented by the following general formula (IV-a) wherein constituent units derived from said non-conjugated triene or tetraene are represented by the following general formula (IV-b), and the non-conjugated triene or tetraene represented by the general formula (III-a) is preferably a compound represented by the following general formula (V-a) wherein constituent units derived from said non-conjugated triene or tetraene are represented by the following general formula (V-b).

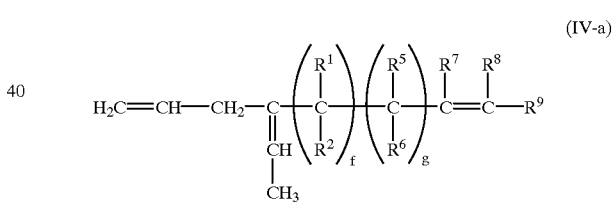
(IV-a)

wherein f is an integer of 0 to 5; g is an integer of 1 to 6; $R^1$, $R^2$, $R^5$, $R^6$ and $R^7$ may be the same or different and are each a hydrogen atom or an alkyl group of 1 to 5 carbon atoms; $R^8$ is a hydrogen atom or an alkyl group of 1 to 5 carbon atoms; and $R^9$ is a hydrogen atom, an alkyl group of 1 to 5 carbon atoms or a group represented by —$(CH_2)_n$—$CR^{10}$=$CR^{11}R^{12}$ (n is an integer of 1 to 5, $R^{10}$ and $R^{11}$ may be the same as or different from each other and are each a hydrogen atom or an alkyl group of 1 to 5 carbon atoms, and $R^{12}$ is an alkyl group of 1 to 5 carbon atoms).

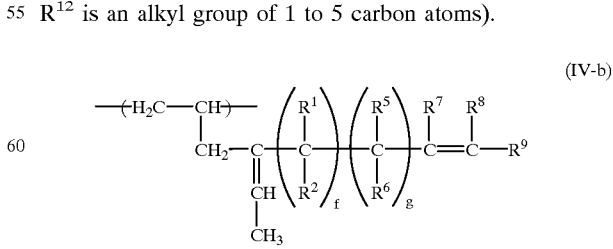
(IV-b)

wherein f, g, $R^1$, $R^2$, and $R^5$ to $R^9$ have the same meanings as in the formula (IV-a).

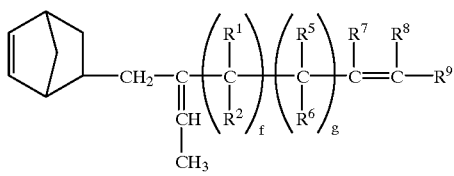

(V-a)

wherein f, g, $R^1$, $R^2$ and $R^5$ to $R^9$ have the same meanings as in the formula (IV-a).

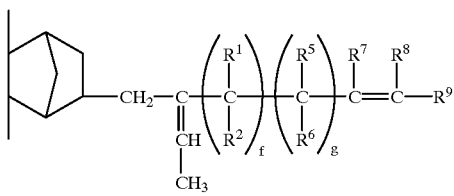

(V-b)

wherein f, g, $R^1$, $R^2$, and $R^5$ to $R^9$ have the same meanings as in the formula (IV-a).

In the present invention, the above-described non-conjugated polyene (iii) is preferably at least one non-conjugated triene or tetraene selected from compounds represented by the general formula (II-a) wherein constituent units derived from said non-conjugated polyene are represented by the general formula (II-b), and particularly, is preferably at least one non-conjugated triene or tetraene selected from compounds represented by the general formula (IV-a) wherein constituent units derived from said non-conjugated polyene are represented by the general formula (IV-b).

In the present invention, the above-described diene rubber (B) is preferably at least one rubber selected from the group consisting of natural rubber, isoprene rubber, styrene-butadiene rubber and butadiene rubber.

The rubber composition for a tire side wall of the present invention is formed into a given shape, then subjected to vulcanization to obtain a tire side wall.

Examples of the rubber composition for a tire tread of the present invention include the following compositions:

(1) A rubber composition for a tire tread wall comprising
   (A') an unsaturated olefin copolymer prepared from
      (i) ethylene,
      (ii) an aromatic vinyl compound,
      (iii) a non-conjugated polyene, and optionally
      (iv) an α-olefin having 3 or more carbon atoms, in which the molar ratio [(i)/(iv)] of constituent units derived from ethylene (i) to constituent units derived from the α-olefin having 3 or more carbon atoms (iv) is in the range of from 100/0 to 40/60, and the molar ratio [((i)+(iv))/(ii)] of the sum of constituent units derived from ethylene (i) and constituent units derived from the α-olefin having 3 or more carbon atoms (iv) to constituent units derived from aromatic vinyl compound (ii) is in the range of from 99/1 to 85/15, and
   (B) a diene rubber,
      wherein the weight ratio [(A')/(B)] of the unsaturated olefin copolymer (A') to the diene rubber (B) is from 1/99 to 50/50.

(2) The rubber composition for a tire tread according to the above-described (1), wherein the intrinsic viscosity [η] of the unsaturated olefin copolymer (A') measured in decalin at 135° C. is from 1 to 10 dl/g.

(3) The rubber composition for a tire tread according to the above-described (1) or (2), wherein the iodine number of the unsaturated olefin copolymer (A') is from 1 to 50.

(4) The rubber composition for a tire tread according to any of the above-described (1) to (3), wherein the non-conjugated polyene (iii) constituting the unsaturated olefin copolymer (A') is a triene or tetraene of a hydrocarbon.

(5) The rubber composition for a tire tread according to any of the above-described (1) to (3), wherein the non-conjugated polyene (iii) constituting the unsaturated olefin copolymer (A') is a non-conjugated triene or tetraene represented by the above-described general formula (II-a) or (III-a).

(6) The rubber composition for a tire tread according to any of the above-described (1) to (3), wherein the non-conjugated polyene (iii) constituting the unsaturated olefin copolymer (A') is a non-conjugated triene or tetraene represented by the above-described general formula (IV-a) or (V-a).

(7) The rubber composition for a tire tread according to any of the above-described (4) to (6), wherein the above-described non-conjugated triene or tetraene is a non-conjugated triene or tetraene having a total of 9 or more hydrogen atoms directly bonded to all the carbon atoms adjacent to all the carbon—carbon double bonds in one molecule.

(8) The rubber composition for a tire tread according to any of the above-described (1) to (7), wherein the diene rubber (B) is natural rubber, isoprene rubber, styrene/butadiene copolymer rubber, butadiene rubber or a mixture thereof.

BEST MODE FOR CARRYING OUT THE INVENTION

The rubber composition for a tire side wall of the present invention comprises (A) a specific unsaturated olefin copolymer and (B) diene rubber, and optionally (C) carbon black and/or (D) a vulcanizing agent.

The rubber composition for a tire tread of the present invention contains (A') a specific unsaturated olefin copolymer and (B) diene rubber.

First, respective components used in the rubber composition for a tire side wall and the rubber composition for a tire tread of the present invention are explained.

(A) Unsaturated Olefin Copolymer and (A') Unsaturated Olefin Copolymer

The (A) unsaturated olefin copolymer and (A') unsaturated olefin copolymer are each a random copolymer of (i) ethylene, (ii) an aromatic vinyl compound and (iii) a non-conjugated polyene, or a random copolymer of (i) ethylene, (ii) an aromatic vinyl compound, (iii) a non-conjugated polyene and (iv) an α-olefin having 3 or more carbon atoms.

(ii) Aromatic Vinyl Compound

As the aromatic vinyl compound (ii), a compound represented by the following general formula (I) is specifically used.

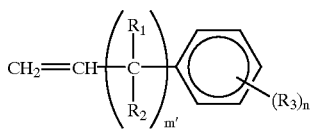 (I)

wherein $R_1$ and $R_2$ may be the same or different and are each a hydrogen atom or an alkyl group having 1 to 8 carbon atoms, preferably a hydrogen atom or an alkyl group having 1 to 3 carbon atoms;

$R_3$ is an alkyl group having 1 to 8 carbon atoms, alkoxy group, carboxyl group, acyloxy group, acyloxy-substituted alkyl group, hydroxyl group or halogen atom, m' is an integer of from 0 to 5, preferably from 0 to 3; and n' is an integer of from 0 to 2, preferably 0 or 1.

Examples of the aromatic vinyl compounds as described above include styrene; mono- or polyalkylstyrenes such as methylstyrene, dimethylstyrene, ethylstyrene and the like; functional group-containing styrene derivatives such as methoxystyrene, ethoxystyrene, vinylbenzoic acid, methyl vinylbenzoate, vinylbenzyl acetate, hydroxystyrene, chlorostyrene, divinylbenzene and the like; and phenyl-substituted alkenes such as allyl benzene, 4-phenylbutene-1, 3-phenylbutene-1, 4-(4-methylphenyl)butene-1, 4-(3-methylphenyl)butene-1, 4-(2-methylphenyl)butene-1, 4-(4-ethylphenyl)butene-1, 4-(4-butylphenyl)butene-1, 5-phenylpentene-1, 4-phenylpentene-1, 3-phenylpentene-1, 5-(4-methylphenyl)pentene-1, 4-(2-methylphenyl)pentene-1, 3-(4-methylphenyl)pentene-1, 6-phenylhexene-1, 5-phenylhexene-1, 4-phenylhexene-1, 3-phenylhexene-1, 6-(4-methylphenyl)hexene-1, 5-(2-methylphenl)hexene-1, 4-(4-methylphenl)hexene-1, 3-(2-methylphenl)hexene-1 , 7-phenylheptene-1, 6-phenylheptene-1, 5-phenylheptene-1, 4-phenylheptene-1, 8-phenyloctene-1, 7-phenyloctene-1, 6-phenyloctene-1, 5-phenyloctene-1, 4-phenyloctene-1, 3-phenyloctene-1, 10-phenyldecene-1 and the like. Of these aromatic vinyl compounds, styrene, allylbenzene, 4-phenylbutene-1 are preferable, and particularly, styrene is preferably used. The aromatic vinyl compounds can be used alone or in combination of two or more kinds.

(iii) Non-conjugated Polyene

Examples of the non-conjugated polyene (iii) include diene compounds such as dicyclopentadiene, 1,4-hexadiene, cyclooctadiene, methylenenorbornene, ethylidenenorbornene, vinylnorbornene, 7-methyl-1,6-ocatadiene and the like, non-conjugated trienes or tetraenes having one vinyl group in one molecule, and non-conjugated trienes or tetraenes having one 5-norbornene-2-yl group in one molecule. The total carbon atom number of this non-conjugated triene or tetraene (when two or more non-conjugated trienes or tetraenes are present, average carbon atom number) is not specifically limited, and it is desirable that the number is preferably from 9 to 30, more preferably from 10 to 25, and particularly preferably from 10 to 22. A non-conjugated triene or tetraene of which carbon atom number is in such a range is advantageous since handling thereof such as purification and the like is easy. In this specification the term "triene" indicates a hydrocarbon compound having 3 carbon—carbon double bonds (C=C) in one molecule, and the term "tetraene" indicates a hydrocarbon compound having 4 carbon—carbon double bonds (C=C) in one molecule. This carbon—carbon double bond includes a carbon—carbon double bond of a vinyl group and a carbon—carbon double bond of a 5-norbornene-2-yl group. When the non-conjugated triene or tetraene as described above is used, there is obtained a rubber composition for a tire tread more excellent in abrasion resistance, braking property, rolling resistance and strength.

The non-conjugated triene or tetraene contains 3 (in the case of triene) or 4 (in the case of tetraene) carbon—carbon double bonds (C=C) including a vinyl group or 5-norbornene-2-yl group. The total number of hydrogen atoms directly bonded to the carbon atoms adjacent to all the carbon—carbon double bonds contained in one molecule of this non-conjugated triene or tetraene is not specifically limited, and it is desirable that the number is preferably from 9 to 33, more preferably from 12 to 33, and particularly preferably from 14 to 33. It is preferable that the total number of hydrogen atoms is in this range, since a copolymer having high cross-linking reaction rate is obtained. Further, when the total number of hydrogen atoms is in this range, a rubber composition for a tire side wall or a rubber composition for a tire tread excellent in strength property is obtained. When the non-conjugated triene or tetraene used is a mixture of two or more, this hydrogen atom number is represented by an average value of these hydrogen atom numbers.

The counting method of "the number of hydrogen atoms" as described above is explained specifically. In the following compound, there are four carbon—carbon double bonds in total, namely a 1–2 carbon bond (vinyl group), 4–5 carbon bond, 12–14 carbon bond and 16–17 carbon bond. The carbon atoms adjacent to these carbon—carbon double bonds are number 3, 6, 7, 11, 13, 15 and 18 carbons (excluding Nos. 8, 9, 10 and 19 carbons). Therefore, the sum of hydrogen atoms bonded to all the carbon atoms adjacent to all the carbon—carbon double bonds is 16 since there are two hydrogen atoms on No. 3 carbon atom, three on No. 6, two on No. 7, two on No. 11, three on No. 13, two on No. 15, and two on No. 18.

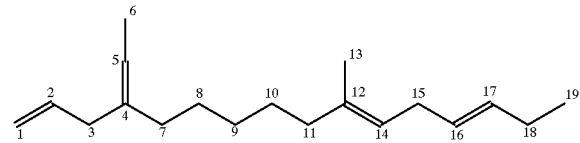

A compound represented by the following formula (5-ethylidene-2-norbornene) has two carbon—carbon double bonds, namely, a 2–3 carbon bond and a 5–8 carbon bond. The carbon atoms adjacent to these carbon—carbon double bonds are Nos. 1, 4, 6 and 9 carbon atoms (excluding No. 7 carbon atom). Therefore, the sum of hydrogen atoms bonded to all the carbon-atoms adjacent to all the carbon—carbon double bonds is 7 since there are one hydrogen atom on No. 1 carbon atom, one on No. 4, two on No. 6, and three on No. 9.

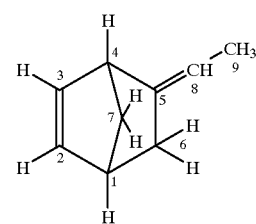

In the present invention, of the non-conjugated trienes or tetraenes, a non-conjugated triene or tetraene in which one linear hydrocarbon group and two hydrogen atoms are bonded to a carbon atom adjacent to a vinyl group or 5-norbornene-2-yl group is preferred. Namely, a non-conjugated triene or tetraene in which a vinyl group or 5-norbornene-2-yl group is bonded to a methylene group (—CH$_2$—) is preferred.

Of these non-conjugated trienes or tetraenes, compounds represented by the following general formulae (II-a) or (III-a) are preferred.

(II-a)

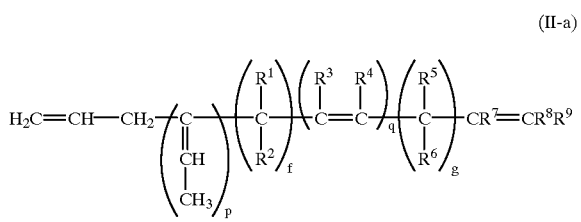

In the above formula, p and q may be the same or different, and are each 0 or 1, with the proviso that each of p and q is not 0 at the same time.

f is an integer of 0 to 5, preferably 0 or an integer of 1 or 2, with the proviso that f is not 0 when p and q are each 1.

g is an integer of 1 to 6, preferably an integer of 1 to 3.

$R^1$, $R^2$, $R^3$, $R^4$, $R^5$, $R^6$ and $R^7$ may be the same as or different from each other, and they are each a hydrogen atom or an alkyl group of 1 to 5 carbon atoms, preferably they are each a hydrogen atom or an alkyl group of 1 to 3 carbon atoms, and more preferably $R^1$, $R^2$, $R^3$, $R^4$, $R^5$ and $R^6$ are each a hydrogen atom and $R^7$ is a hydrogen atom or an alkyl group of 1 to 3 carbon atoms.

$R^8$ is a hydrogen atom or an alkyl group of 1 to 5 carbon atoms, preferably a hydrogen atom or an alkyl group of 1 to 3 carbon atoms, more preferably an alkyl group of 1 to 3 carbon atoms.

$R^9$ is a hydrogen atom, an alkyl group of 1 to 5 carbon atoms or a group represented by —(CH$_2$)$_n$—CR$^{10}$=CR$^{11}$R$^{12}$ (n is an integer of 1 to 5, $R^{10}$ and $R^{11}$ may be the same as or different from each other and are each a hydrogen atom or an alkyl group of 1 to 5 carbon atoms, and $R^{12}$ is an alkyl group of 1 to 5 carbon atoms), preferably a hydrogen atom, an alkyl group of 1 to 3 carbon atoms or a group represented by —(CH$_2$)$_n$—CR$^{10}$=CR$^{11}$R$^{12}$ (n is an integer of 1 to 3, $R^{10}$ and $R^{11}$ may be the same as or different from each other and are each a hydrogen atom or an alkyl group of 1 to 3 carbon atoms, and $R^{12}$ is an alkyl group of 1 to 3 carbon atoms), with the proviso that when p and q are each 1, $R^9$ is a hydrogen atom or an alkyl group of 1 to 5 carbon atoms.

(III-a)

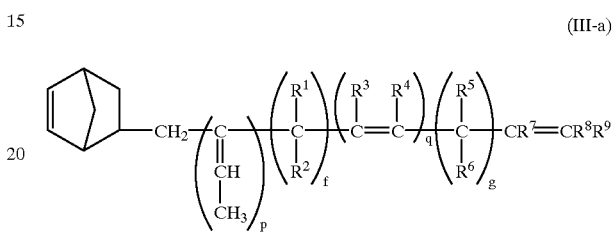

wherein p, q, f, g, and $R^1$ to $R^9$ have the same meanings as in the above formula (II-a).

When the non-conjugated polyene (iii) is a non-conjugated triene or tetraene represented by the above-described general formula (II-a) or (III-a), the composition has higher vulcanization rate, and a tire side wall and tire tread obtained from the composition has excellent strength property.

Specific examples of the non-conjugated triene or tetraene represented by the above-described general formula (II-a) include the following compounds.

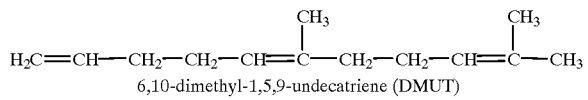
6,10-dimethyl-1,5,9-undecatriene (DMUT)

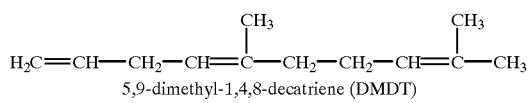
5,9-dimethyl-1,4,8-decatriene (DMDT)

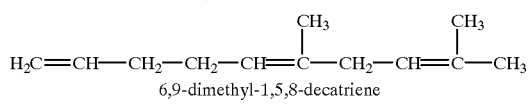
6,9-dimethyl-1,5,8-decatriene

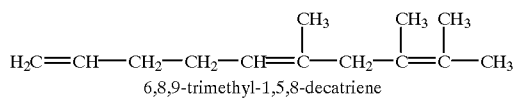
6,8,9-trimethyl-1,5,8-decatriene

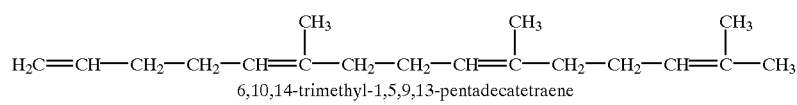
6,10,14-trimethyl-1,5,9,13-pentadecatetraene

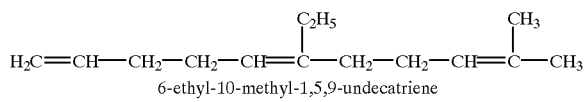
6-ethyl-10-methyl-1,5,9-undecatriene

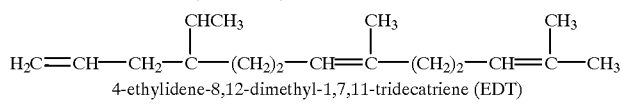
4-ethylidene-8,12-dimethyl-1,7,11-tridecatriene (EDT)

Specific examples of the non-conjugated triene or tetraene represented by the above-described general formula (III-a) include compounds in which a vinyl group of the compounds exemplified as the non-conjugated triene or tetraene represented by the above-described general formula (II-a) is substituted by a 5-norbornene-2-yl group.

Of the non-conjugated trienes or tetraenes represented by the above-described general formula (II-a), non-conjugated trienes or tetraenes represented by the following general formula (IV-a) are preferred. These non-conjugated trienes or tetraenes are compounds corresponding to the non-conjugated trienes or tetraenes represented by the above-described general formula (II-a), wherein p is 1, and q is 0.

Of the non-conjugated trienes or tetraenes represented by the above-described general formula (III-a), non-conjugated trienes or tetraenes represented by the following general formula (V-a) are preferred. These non-conjugated trienes or tetraenes are compounds corresponding to the non-conjugated trienes or tetraenes represented by the above-described general formula (III-a), wherein p is 1, and q is 0.

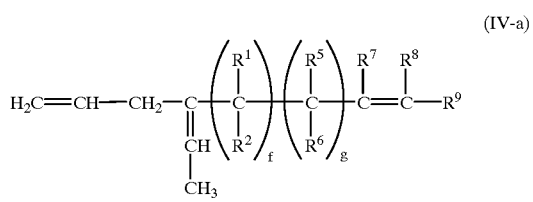

(IV-a)

In the above formula, f is an integer of 0 to 5, preferably 0 or an integer of 1 or 2.

g is an integer of 1 to 6, preferably an integer of 1 to 3.

$R^1$, $R^2$, $R^5$, $R^6$ and $R^7$ may be the same or different, and they are each the same as in the formula (II-a), preferably they are each a hydrogen atom or an alkyl group of 1 to 3 carbon atoms, and more preferably $R^1$, $R^2$, $R^5$ and $R^6$ are each a hydrogen atom and $R^7$ is a hydrogen atom or an alkyl group of 1 to 3 carbon atoms.

$R^8$ is the same as in the formula (II-a), preferably a hydrogen atom or an alkyl group of 1 to 3 carbon atoms, more preferably an alkyl group of 1 to 3 carbon atoms.

$R^9$ is the same as in the formula (II-a), preferably a hydrogen atom or an alkyl group of 1 to 3 carbon atoms.

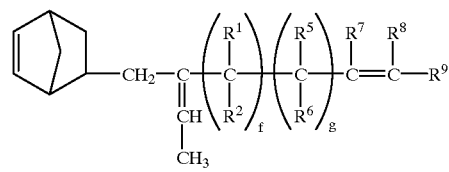

(V-a)

In the above formula, f, g, $R^1$, $R^2$, and $R^5$ to $R^9$ have the same meanings as in the formula (IV-a).

When the non-conjugated polyene (iii) is a non-conjugated triene or tetraene represented by the above-described general formula (IV-a) or (V-a), the composition has higher vulcanization rate, and a tire side wall and tire tread obtained from the composition each has excellent strength property.

Specific examples of the non-conjugated triene or tetraene represented by the above-described general formula (IV-a) or (V-a) include non-conjugated trienes represented by the following general formula (1a) or (2a) or non-conjugated trienes represented by the following general formula (3a) or (4a). Of these compounds, non-conjugated trienes or tetraenes, wherein $R^1$, $R^2$, $R^5$ and $R^6$ all are a hydrogen atom, are preferred. When $R^1$, $R^2$, $R^5$ and $R^6$ all are a hydrogen atom, there are obtained unsaturated olefin compounds (A) and (A') excellent in polymerization reactivity and further excellent in vulcanization rate and thermal stability. Examples of non-conjugated trienes, wherein $R^1$, $R^2$, $R^5$ and $R^6$ all are a hydrogen atom, are represented by the following general formula (5a) or (6a).

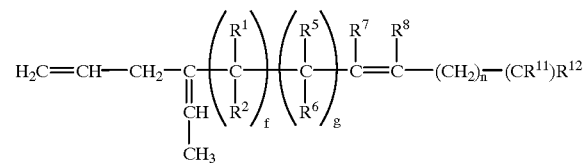

(1a)

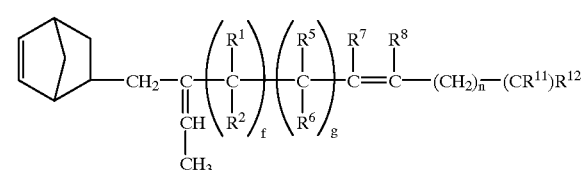

(2a)

(3a)

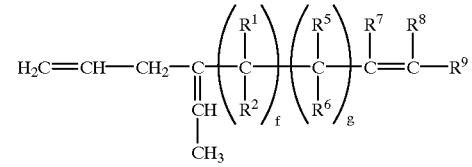

(4a)

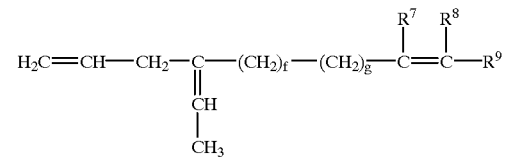

(5a)

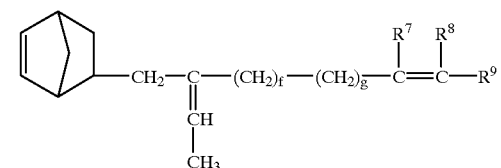

(6a)

In the general formula (1a) or (2a), f is an integer of from 0 to 5, g is an integer from 1 to 6, $R^1$, $R^2$, $R^5$, $R^6$ and $R^7$ are each a hydrogen atom or an alkyl group having 1 to 5 carbon atoms, $R^8$ is an alkyl group having 1 to 5 carbon atoms, n is an integer of from 1 to 5, $R^{10}$ and $R^{11}$ are each a hydrogen atom or an alkyl group having 1 to 5 carbon atoms, $R^{12}$ is an alkyl group having 1 to 5 carbon atoms. In the general formula (3a) or (4a), f is an integer of from 0 to 5, g is an integer of from 1 to 6, $R^1$, $R^2$, $R^5$, $R^6$ and $R^7$ are each a hydrogen atom or an alkyl group having 1 to 5 carbon atoms, $R^8$ is an alkyl group having 1 to 5 carbon atoms, and $R^9$ is an alkyl group having 1 to 5 carbon atoms. In the general formula (5a) or (6a), f, g, $R^7$ and $R^8$ are as defined in the general formula (3a) or (4a). Preferable definitions of $R^7$ and $R^8$ are the same as in the general formula (IV-a) or (V-a). $R^9$ is a hydrogen atom or an alkyl group having 1 to 5 carbon atoms, preferably having 1 to 3 carbon atoms.

Specific examples of the non-conjugated triene or tetraene represented by the above-described general formula (IV-a) include the following compounds. Of these compounds, compounds (5), (6), (9), (11), (14), (19) and (20) are preferred.

(1)
$H_2C=CH-CH_2-C(=CH(CH_3))-CH_2-CH=CH(CH_3)$
4-ethylidene-1,6-octadiene (2)
$H_2C=CH-CH_2-C(=CH(CH_3))-CH_2-CH=C(CH_3)_2$
7-methyl-4-ethylidene-1,6-octadiene (3)
$H_2C=CH-CH_2-C(=CH(CH_3))-CH_2-CH=C(CH_3)(C_2H_5)$
7-methyl-4-ethylidene-1,6-nonadiene (4)
$H_2C=CH-CH_2-C(=CH(CH_3))-CH_2-CH=C(C_2H_5)_2$
7-ethyl-4-ethylidene-1,6-nonadiene (5)
$H_2C=CH-CH_2-C(=CH(CH_3))-CH_2-C(CH_3)=C(CH_3)_2$
6,7-dimethyl-4-ethylidene-1,6-octadiene (6)
$H_2C=CH-CH_2-C(=CH(CH_3))-CH_2-C(CH_3)=C(CH_3)(C_2H_5)$
6,7-dimethyl-4-ethylidene-1,6-nonadiene (7)
$H_2C=CH-CH_2-C(=CH(CH_3))-CH_2-CH=CH(CH_2CH_2CH_3)$
4-ethylidene-1,6-decadiene (8)
$H_2C=CH-CH_2-C(=CH(CH_3))-CH_2-CH=C(CH_3)(CH_2CH_2CH_3)$
7-methyl-4-ethylidene-1,6-decadiene (9)
$H_2C=CH-CH_2-C(=CH(CH_3))-CH_2-C(CH_2CH_2CH_3)=C(CH_3)_2$
7-methyl-6-propyl-4-ethylidene-1,6-octadiene

(10)
$H_2C=CH-CH_2-C(=CH(CH_3))-CH_2CH_2-CH=CH(CH_3)$
4-ethylidene-1,7-nonadiene

(11)
$H_2C=CH-CH_2-C(=CH(CH_3))-CH_2CH_2-CH=C(CH_3)_2$
8-methyl-4-ethylidene-1,7-nonadiene (EMN)

(12)
$H_2C=CH-CH_2-C(=CH(CH_3))-CH_2CH_2-CH=CH(CH_2CH_2CH_3)$
4-ethylidene-1,7-undecadiene

(13)
$H_2C=CH-CH_2-C(=CH(CH_3))-CH_2CH_2-CH=C(CH_3)(CH_2CH_2CH_3)$
8-methyl-4-ethylidene-1,7-undecadiene

(14)
$H_2C=CH-CH_2-C(=CH(CH_3))-CH_2CH_2-C(CH_3)=C(CH_3)_2$
7,8-dimethyl-4-ethylidene-1,7-nonadiene

(15)
$H_2C=CH-CH_2-C(=CH(CH_3))-CH_2CH_2-C(CH_3)=C(CH_3)(C_2H_5)$
7,8-dimethyl-4-ethylidene-1,7-decadiene

(16)
$H_2C=CH-CH_2-C(=CH(CH_3))-CH_2CH_2-C(CH_3)=C(CH_3)(CH_2CH_2CH_3)$
7,8-dimethyl-4-ethylidene-1,7-undecadiene, -continued (17)

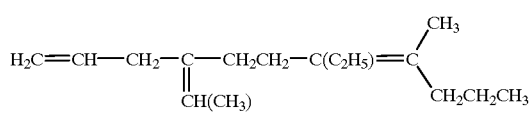

8-methyl-7-ethyl-4-ethylidene-1,7-undecadiene (18)

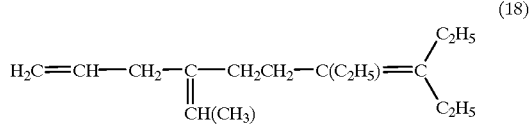

7,8-dimethyl-4-ethylidene-1,7-decadiene (19)

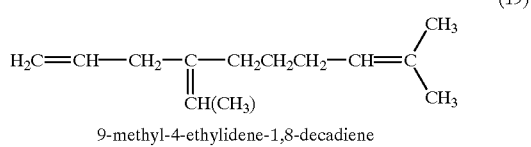

9-methyl-4-ethylidene-1,8-decadiene (20)

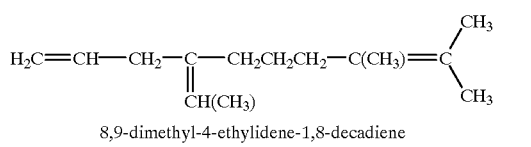

8,9-dimethyl-4-ethylidene-1,8-decadiene (21)

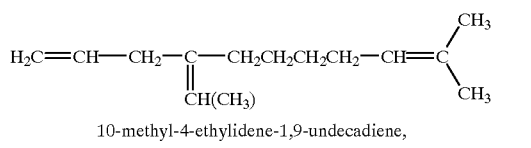

10-methyl-4-ethylidene-1,9-undecadiene, (22)

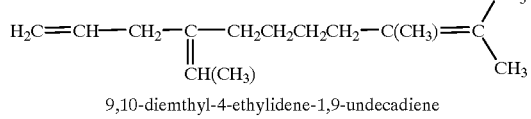

9,10-diemthyl-4-ethylidene-1,9-undecadiene (23)

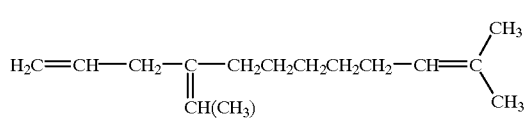

11-methyl-4-ethylidene-1,10-dodecadiene (24)

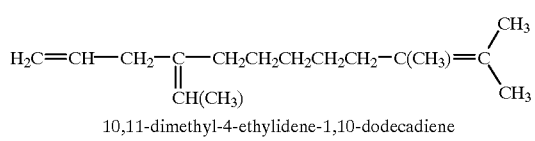

10,11-dimethyl-4-ethylidene-1,10-dodecadiene

Specific examples of the non-conjugated triene or tetraene represented by the above-described general formula (V-a) include compounds in which a vinyl group of the compounds exemplified as the non-conjugated triene or tetraene represented by the above-described general formula (IV-a) is substituted by a 5-norbornene-2-yl group.

In the present invention, the non-conjugated polyene (iii) is preferably a compound represented by the above-described general formula (II-a), more preferably a compound represented by the above-described general formula (IV-a) or (V-a), and particularly preferably a compound represented by the above-described general formula (IV-a).

When the non-conjugated polyene (iii) is a non-conjugated triene or tetraene represented by the above-described general formula (II-a), the composition has higher vulcanization rate, and a tire side wall and tire tread obtained from the composition has excellent strength property.

It is preferable that the non-conjugated polyene (iii) is a non-conjugated triene or tetraene represented by the above-described general formula (IV-a) from the viewpoints of mechanical strength, thermal stability and low temperature property, and when it is a non-conjugated triene or tetraene represented by the above-described general formula (IV-a), a tire side wall and tire tread obtained from the composition are particularly excellent in cold resistance, low temperature property and vulcanization strength of vulcanized products.

The above-described non-conjugated triene or tetraene may be a mixture of a trans body and cis body or may be a single trans body or a single cis body. The structural formula in this specification does not limit the steric structure.

These non-conjugated polyenes (iii) may be used alone or in combination of two or more kinds. For example, a non-conjugated triene or tetraene represented by the above-described general formula (II-a) or (III-a) may be used in combination of two or more kinds, a non-conjugated tetraene represented by the above-described general formula (1a) and a non-conjugated triene represented by the above-described general formula (3a) or (5a) may be used in combination, and a non-conjugated tetraene represented by the above-described general formula (1a) and a non-conjugated triene represented by the above-described general formula (4a) may be used in combination.

Structure of a non-conjugated triene or tetraene can be determined by measuring mass spectrum, infrared absorption spectrum, proton NMR spectrum and the like.

A non-conjugated triene or tetraene represented by the above-described general formula (II-a) or (III-a) can be prepared, for example, by conventionally known methods as disclosed in EP0691354A1 and WO96/20150.

Specifically, a vinyl-containing halogenated compound (for example, halogenated allyl or halogenated vinyl) is first reacted with metal Mg to prepare a Grignard reagent (allyl-MgX or vinyl-MgX), then, this Grignard reagent is reacted with a halogenated compound of a non-conjugated double bond-containing hydrocarbon (for example, halogenated geranyl) to produce a non-conjugated triene or tetraene represented by the above-described general formula (II-a) or (III-a) through a free radical reaction.

A non-conjugated triene or tetraene represented by the above-described general formula (IV-a) can be prepared, for example, by a method disclosed in Japanese Patent Laid-Open Application (JP-A) No. Hei 6-154952 applied by the present applicant, namely, it can be synthesized by reacting ethylene with a conjugated diene compound represented by the following general formula (IV-a') or (IV-a").

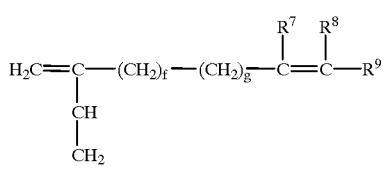

In the general formulae (IV-a') and (IV-a"), f, g, $R^1$, $R^2$ and $R^5$ to $R^9$ are as defined in the general formulae (IV-a).

Examples of non-conjugated diene compounds represented by the general formulae (IV-a") include the following compounds.

3-methylene-1,5-heptadiene, 6-methyl-3-methylene-1,5-heptadiene, 6-methyl-3-methylene-1,5-octadiene, 6-ethyl-3-methylene-1,5-octadiene, 5,6-dimethyl-3-methylene-1,5-heptadiene, 5,6-dimethyl-3-methylene-,1,5-octadiene, 3-methylene-1,5-nonadiene, 6-methyl-3-methylene-1,5-nonadiene, 6-methyl-5-propyl-3-methylene-1,5-heptadiene, 3-methylene-1,6-octadiene, 7-methyl-3-methylene-1,6-octadiene, 3-methylene-1,6-decadiene, 7-methyl-3-methylene-1,6-decadiene, 6,7-dimethyl-3-methylene-1,6-decadiene, 6,7-dimethyl-3-methylene-1,6-nonadiene, 6,7-dimethyl-3-methylene-1,6-decadiene, 7-methyl-6-ethyl-3-methylene-1,6-decadiene, 6,7-diethyl-3-methylene-1,6-nonadiene, 8-methyl-3-methylene-1,7-nonadiene, 7,8-dimethyl-3-methylene-1,7-nonadiene, 9-methyl-3-methylene-1,8-decadiene, 8,9-dimethyl-3-methylene-1,8-decadiene, 10-methyl-3-methylene-1,9-undecadiene and 9,10-dimethyl-3-methylene-1,9-undecadiene.

The reaction of a conjugated diene compound with ethylene is conducted, though it varies depending on the kind of the conjugated diene compound, at a temperature usually of from 50 to 200° C., preferably from 70 to 150° C., at an ethylene pressure of 0.049 to 9.8 Mpa (0.5 to 100 kgf/cm$^2$, gage pressure), preferably 0.98 to 9.8 Mpa (1 to 100 kgf/cm$^2$, gage pressure), more preferably 0.49 to 6.9 Mpa (5 to 70 kgf/cm$^2$, gage pressure), for 0.5 to 30 hours. Ethylene may be added to a reaction vessel continuously or intermittently.

This reaction may be conducted in an inert gas atmosphere such as nitrogen and argon. Though this reaction can be conducted without using a solvent, it can also be conducted in the presence of an inert hydrocarbon type solvent such as hexane, heptane, octane, nonane, decane, undecane, dodecane, tridecane, toluene, xylene and the like.

In the above-described reaction, an intended non-conjugated triene or tetraene is usually obtained in the form of a mixture of a trans body and cis body, however, one steric isomer may be obtained singularly. The mixture can be separated into the trans body and the cis body by distillation. Further, both bodies can be subjected to polymerization without separation.

The reaction of a conjugated diene compound with ethylene is usually conducted in the presence of a catalyst. Especially when this reaction is conducted in the presence of a catalyst composed of a transition metal compound and an organoalulminum compound, an intended non-conjugated triene or tetraene is efficiently obtained.

Further, the non-conjugated triene or tetraene represented by the general formula (IV-a) obtained as described above is reacted with dicylopentadiene through Diels-Alder reaction to obtain a non-conjugated triene or tetraene represented by the general formula (V-a).

Examples of non-conjugated polyene other than the above-described non-conjugated triene or tetraene include aliphatic non-conjugated dienes or alicyclic non-conjugated dienes having one copolymerizable carbon—carbon double bond in one molecule, non-conjugated dienes having two copolymerizable carbon—carbon double bonds in one molecule, and the like. These non-conjugated dienes can be used alone or in combination of two or more kinds, or combined with the above-described non-conjugated triene or tetraene.

Examples of the above-described aliphatic non-conjugated diene include 1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, and the like. Of the compounds, 7-methyl-1,6-octadiene and the like are preferred. These may be used alone or in combination of two or more kinds.

Examples of the above-described alicyclic non-conjugated diene include 5-ethylidene-2-norbornene, 5-propylidene-2-norbornene, 5-butylidene-2-norbornene, 2-methyl-2,5-norbornadiene, 2-ethyl-2,5-norbornadiene and the like. Of these compounds, 5-ethylidene-2-norbornene is preferred. These may be used alone or in combination of two or more kinds.

Examples of the above-described non-conjugated diene having two carbon—carbon double bonds in one molecule include 5-alkenyl-2-norbornenes such as 5-vinyl-2-norbornene, 5-allyl-2-norbornene and the like; alicyclic dienes such as 2,5-norbornadiene, dicyclopentadiene, norbornadiene, tetracyclo[4.4.0.1$^{2,5}$.1$^{7,10}$]deca-3,8-diene and the like; α,ω-dienes such as 1,7-octadiene, 1,9-decadiene, and the like. Of these compounds, 5-alkenyl-2-norbornenes, dicyclopentadiene, 2,5-norbornadiene, 1,7-octadiene, 1,9-decadiene and the like are preferred, and 5-vinyl-2-norbornene is particularly preferred. These may be used alone or in combination of two or more kinds.

In the present invention, it is preferable that the non-conjugated polyene is a non-conjugated triene or tetraene from the viewpoints of processability (vulcanization rate) and strength after vulcanization, that the non-conjugated polyene is a non-conjugated triene or tetraene represented by the above-described general formula (II-a) or (III-a) from the above-described two viewpoints, and further that the non-conjugated polyene is a on-conjugated triene or tetraene represented by the above-described general formula (IV-a) or (V-a). Further, it is preferable that the non-conjugated polyene is a non-conjugated triene or tetraene represented by the above-described general formula (V-a) from the viewpoints of cold resistance, low temperature property and mechanical strength.

(iv) α-olefin Having 3 or More Carbon Atoms

Specific examples of the α-olefin having 3 or more carbon atoms (iv) include α-olefins having 3 to 20 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicocene and the like.

For the unsaturated olefin copolymer (A), α-olefins having 4 or more carbon atoms among them are preferred, and 1-butene, 1-hexene, 1-octene, 1-decene are particularly preferred.

For the unsaturated olefin copolymer (A'), propylene, 1-butene, 1-hexene, 4-methyl-1-pentene, 1-octene and 1-decene are preferred among them.

These α-olefins can be used alone or in combination of two or more kinds.

The unsaturated olefin copolymer (A) and unsaturated olefin copolymer (A') used in the present invention can contain other copolymerizable monomers in addition to the above-described monomers in a range not prejudicial to the object of the present invention.

The unsaturated olefin copolymer (A) and unsaturated olefin copolymer (A') are a copolymer in which constituent units derived from ethylene (i), constituent units derived from an aromatic vinyl compound (ii) and constituent units derived from a non-conjugated polyene (iii) are randomly arranged and bonded, a branch structure derived from the non-conjugated polyene (iii) is contained, and the main chain has substantially linear structure, or a copolymer in which constituent units derived from ethylene (i), constituent units derived from an aromatic vinyl compound (ii), constituent units derived from a non-conjugated polyene (iii) and constituent units derived from an α-olefin having 3 or more carbon atoms (iv) are randomly arranged and bonded, a branch structure derived from the non-conjugated polyene (iii) is contained. The fact that this copolymer has a substantially linear structure and contains substantially no gel crosslinked polymer can be confirmed by the fact that the copolymer is dissolved in an organic solvent and contains substantially no insoluble component. It can be confirmed, for example, by the fact that the copolymer is completely dissolved in decalin at 135° C. when the intrinsic viscosity [η] is measured.

In the unsaturated olefin copolymer (A) used in the rubber composition for a tire side wall, it is desirable that the molar ratio [((i)/(iv)] of constituent units derived from ethylene (i) to constituent units derived from the α-olefin having 3 or more carbon atoms (iv) is in the range from 100/0 to 40/60, preferably from 95/5 to 55/45, more preferably from 90/10 to 60/40, and further preferably from 80/20 to 60/40, and the molar ratio [((i)+(iv))/(ii)] of the sum of constituent units derived from ethylene (i) and constituent units derived from the α-olefin having 3 or more carbon atoms (iv) to constituent units derived from the aromatic vinyl compound (ii) is in the range from 98/2 to 60/40, preferably from 97/3 to 70/30, and more preferably from 96/4 to 80/20.

When the molar ratio [(i)/(iv)] of constituent units derived from ethylene (i) to constituent units derived from the α-olefin having 3 or more carbon atoms (iv) is within the range from 95/5 to 55/45, a tire side wall obtained from the rubber composition for tire side wall of the present invention is excellent in low temperature property. Further, when the ratio of constituent units derived from an aromatic vinyl compound (ii) is less than the above-described range, a tire side wall obtained from the rubber composition for tire side wall of the present invention may sometimes be inferior in scratch resistance, bending resistance, vibration resistance, and on the other hand, when the ratio of the constituent units derived from an aromatic vinyl compound (ii) is over the above-described range, the tire side wall may sometimes be inferior in strength property, low temperature property and the like.

In the unsaturated olefin copolymer (A), it is desirable that the content of constituent units derived from a non-conjugated polyene (iii) is usually from 0.01 to 30% by mol, preferably from 0.05 to 25% by mol, more preferably from 0.1 to 20% by mol.

Further, it is desirable that the iodine number of the unsaturated olefin copolymer (A) is usually from 10 to 50, preferably from 15 to 40, more preferably from 20 to 35. When the iodine number of the unsaturated olefin copolymer (A) is within the above-described range, the rubber composition for a tire side wall has high vulcanization rate and the resulting tire side wall has excellent thermal resistance.

It is desirable that the unsaturated olefin copolymer (A) has an intrinsic viscosity [η] measured in decalin at 135° C. is within the range of usually from 1.0 to 6.0 dl/g, preferably from 2.0 to 5.5 dl/g, more preferably from 3.0 to 5.0 dl/g. When the intrinsic viscosity [η] of the unsaturated olefin copolymer (A) is within the above-described range, the copolymer (A) is excellent in kneading property with the diene rubber (B), and the resulting tire side wall is excellent in strength property.

In the unsaturated olefin copolymer (A) of the present invention, it is preferable that at least one of the molar ratio of constituent units, the intrinsic viscosity [η] and the iodine number is within the above-described range, and more preferably two or more of them are within the above-described ranges, and particularly, it is preferable that all the molar ratio of constituent units, the intrinsic viscosity [η] and the iodine number are within the above-described ranges.

In the unsaturated olefin copolymer (A') used in the rubber composition for a tire tread rubber, the molar ratio [(i)/(iv)] of constituent units derived from ethylene (i) to constituent units derived from the α-olefin having 3 or more carbon atoms (iv) is in the range of from 100/0 to 40/60, preferably from 100/0 to 55/45, more preferably from 100/0 to 70/30, and particularly preferably from 100/0 to 90/10, and the molar ratio [((i)+(iv))/(ii)] of the sum of constituent units derived from ethylene (i) and constituent units derived from the α-olefin having 3 or more carbon atoms (iv) to constituent units derived from the aromatic vinyl compound (ii) is in the range of from 99/1 to 85/15, preferably from 99/1 to 90/10, and particularly preferably from 99/1 to 95/5. When the molar ratio of the sum of constituent units derived from ethylene (i) and constituent units derived from the α-olefin having 3 or more carbon atoms (iv) to constituent units derived from the aromatic vinyl compound (ii) is within the above-described range, the unsaturated olefin copolymer (A') excellent in mechanical strength and abrasion resistance is obtained, and consequently, a tire tread rubber excellent in mechanical strength and abrasion resistance is obtained. The above-described molar ratios and the following monomer contents are obtained by measuring $^{13}$C-NMR spectra.

It is desirable that the content of the non-conjugated polyene (iii) of the unsaturated olefin copolymer (A') is from 0.01 to 30% by mol, preferably from 0.05 to 25% by mol, and particularly preferably from 0.1 to 20% by mol, and the iodine number is from 1 to 50, preferably from 3 to 50, and particularly preferably from 5 to 40. These characteristic values are criteria when the unsaturated olefin copolymer (A') is vulcanized using sulfur or a peroxide.

When the non-conjugated polyene (iii) is represented by the above-described general formula (II-a) in these unsaturated olefin copolymers (A) and (A'), the constituent units derived from the non-conjugated triene or tetraene in these copolymers (A) and (A') have a structure represented by the following general formula (II-b)

(II-b)
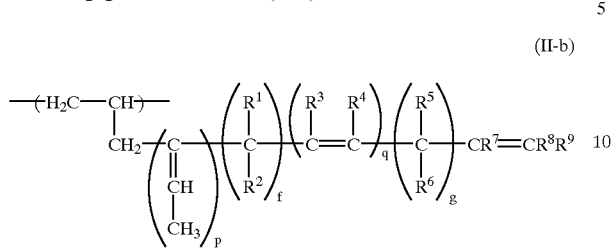

wherein p, q, f, g, $R^1$ to $R^9$ are as defined in the general formula (II-a).

When the non-conjugated polyene (iii) is represented by the above-described general formula (III-a), the constituent units derived from the non-conjugated triene or tetraene in these unsaturated olefin copolymers (A) and (A') have a structure represented by the following general formula (III-b)

(III-b)
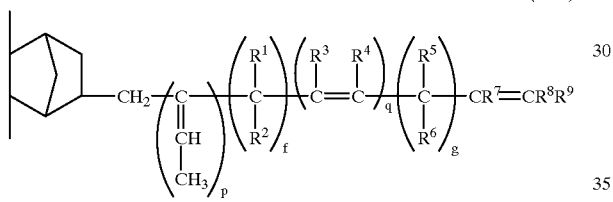

wherein p, q, f, g, $R^1$ to $R^9$ are as defined in the general formula (II-a).

Further, when the non-conjugated polyene (iii) is represented by the above-described general formula (IV-a), the constituent units derived from the non-conjugated triene or tetraene in these unsaturated olefin copolymers (A) and (A') have a structure represented by the following general formula (IV-b)

(IV-b)
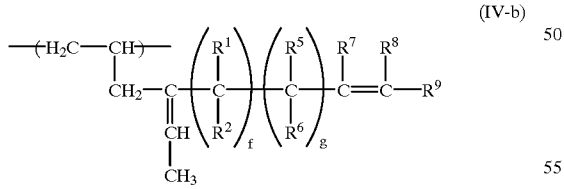

wherein f, g, $R^1$, $R^2$, $R^5$ to $R^9$ are as defined in the general formula (IV-a).

Further, when the non-conjugated polyene (iii) is represented by the above-described general formula (V-a), the constituent units derived from the non-conjugated triene or tetraene in these unsaturated olefin copolymers (A) and (A') have a structure represented by the following general formula (V-b)

(V-b)
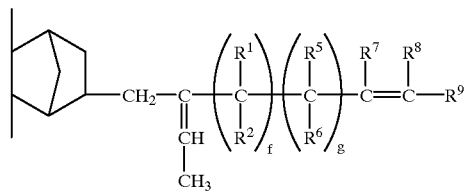

wherein f, g, R1, R2, R6 to R9 are as defined in the general formula (IV-a).

Further, when the non-conjugated triene or tetraene is represented by the above-described general formula (1a), (2a), (3a) or (4a), it is assumed that the constitutent units derived from these monomers have respective structures substantially represented by the following general formula (1b), (2b), (3b) or (4b).

(1b)
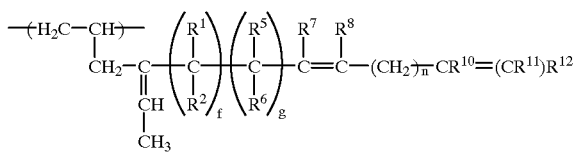

(2b)
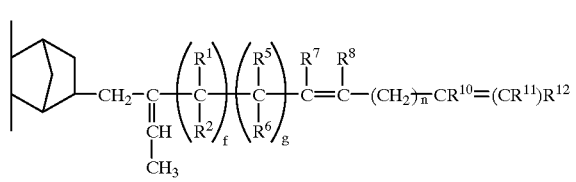

(3b)
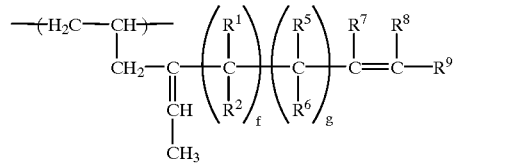

(4b)
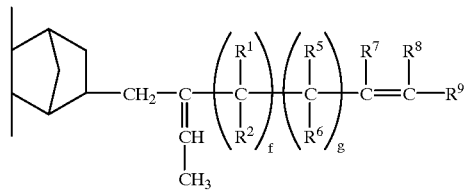

The fact that the constituent units derived from the non-conjugated polyene (iii) have the above-described structures in the unsaturated olefin copolymers (A) and (A') can be confirmed by measuring $^{13}$C-NMR spectra of the copolymer.

Production of Unsaturated Olefin Copolymers (A) and (A')

The unsaturated olefin copolymers (A) and (A') as described above can be obtained by copolymerization of ethylene (i), an aromatic vinyl compound (ii) and a non-conjugated polyene (iii), and optionally an α-olefin having 3 or more carbon atoms (iv), in the presence of a catalyst for olefin polymerization.

As the catalyst for olefin polymerization, a catalyst composed of (a) a compound of a transition metal such as vanadium, zirconium, titanium and the like and (b) an organoaluminum compound (organoalulminum-oxy compound) and/or an ionizing ionic compound, and the like can be used. Specifically, (1) a titanium catalyst composed of a solid titanium catalyst component and an organoalulminum compound, (2) a vanadium catalyst composed of a soluble vanadium compound and an organoaluminum compound, (3) a metallocene catalyst composed of a metallocene compound of transition metal selected from Group IV of Periodic Table and an organoaluminum oxy compound and/or an ionizing ionic compound, and the like. Of these, a metallocene catalyst is particularly preferable. The metallocene catalyst has high activity, and the resulting unsaturated olefin copolymers (A) and (A') have a narrow molecular weight distribution and a narrow composition distribution, and further, the catalyst has high conversion of the aromatic vinyl compound (ii) and the non-conjugated polyene (iii).

The above-described titanium catalyst component can be prepared by contacting a titanium compound, magnesium compound and electron donor as described below. As the titanium compound, a trivalent titanium compound or tetravalent titanium compound is used, and the tetravalent titanium compound is preferable. The tetravalent titanium compounds include, for example, those compound represented by Ti(OR)$_j$X$_{4-j}$ (R is a hydrocarbon group, X is a halogen atom, and $0 \leq j \leq 4$). Among them, preferred are halogen-containing titanium compounds, more preferred are tetrahalogenated titanium, and particularly preferred is titanium tetrachloride.

A magnesium compound used for preparation of the solid titanium catalyst component may be a magnesium compound having reducing property, or may be a magnesium compound having no reducing property. As the magnesium compound having reducing property, a magnesium compound having magnesium-carbon bond and magnesium-hydrogen bond, and the like are mentioned. As the magnesium compound having no reducing property, a compound derived from the above-described magnesium compound having reducing property, a compound derived when a catalyst component is prepared, and the like can be used. A complex compound of this magnesium compound with other metal, composite compound or a mixture with other metal compound can also be used. The magnesium compound may be a mixture of two or more kinds. As the magnesium compound, a magnesium compound having no reducing property is preferable, and a halogen-containing magnesium compound is further preferable, and particularly, magnesium chloride, alkoxy magnesium chloride and aryloxy magnesium chloride are preferred.

As the electron donor used for preparing a solid titanium catalyst component, an organic carboxylate, polyvalent carboxylate and the like are mentioned. The solid catalyst component can be produced by contacting the titanium compound, magnesium compound (or metal magnesium) and electron donor as described above. For producing the solid titanium catalyst component, there are adopted known methods for preparing a titanium catalyst component having high activity from a titanium compound, magnesium compound and electron donor. The above-described components may be contacted in the presence of other reaction reagents such as silicon, phosphorus, aluminum and the like.

As the above-described organoaluminum compound forming the above-described titanium catalyst, a compound having at least one Al-carbon bond in the molecule can be used. As this compound, there are mentioned an organoaluminum compound represented by the following general formula (i)

$$(R^{13})_m\text{-Al}(OR^{14})_n\text{-}H_p X_q \qquad (i),$$

wherein $R^{13}$ and $R^{14}$ are each a hydrocarbon group having usually from 1 to 15, preferably from 1 to 4 carbon atoms, and they may be the same or different, X is an halogen atom, m, n, p and q are numbers satisfying the conditions of $0 < m \leq 3$, $0 \leq n < 3$, $0 \leq p < 3$, $0 \leq q < 3$ and $m+n+p+q=3$.

Further, a complex alkyl compound composed of a Group I metal and aluminum is also mentioned, and can be represented by the following general formula (ii)

$$(M)\text{Al}(R^{13}) \qquad (ii)$$

wherein M is Li, Na or K, and $R^{13}$ is as defined in the general formula (i).

For preparation of the titanium catalyst, an electron donor can optionally be used. As such an electron donor, organosilicon compounds are mentioned, and can be represented by the following general formula (iii) or (iv).

$$R_n\text{Si}(OR')_{4-n} \qquad (iii)$$

$$\text{SiR}_a^1 R_{a\,m1}^2 (OR_a^3)_{3-m1} \qquad (iv)$$

In the general formula (iii), R" and R' are each a hydrocarbon group, n is a number satisfying $0 < n_1 < 4$. In the general formula (iv), $R_a^1$ is a cyclopentyl group or a cyclopentyl group having an alkyl group, $R_a^2$ is an alkyl group, a cyclopentyl group or a cyclopentyl group having an alkyl group, $R_a^3$ is a hydrocarbon group, and $m_1$ is a number satisfying $0 < m_1 < 2$.

As the cyclopentyl group $R_a^1$ having an alkyl group in the above-described general formula (iv), 2-methylcyclopentyl group, 3-methylcyclopentyl group, 2-ethylcyclopentyl group, 2,3-dimethylcyclopentyl group and the like are mentioned.

In the catalyst component forming the titanium catalyst, an α-olefin may be prepolymerized. In the prepolymerization, it is desirable that the α-olefin is prepolymerized in an amount of from 0.1 to 500 g, preferably from 0.3 to 300 g, and particularly preferably from 1 to 100 g per 1 g of the catalyst for olefin polymerization. It is preferable that the prepolymerization is conducted under mild conditions with adding an olefin and the above-described catalyst components to an inactive hydrocarbon medium. The α-olefin used in the prepolymerization may be the same as or different from an α-olefin used for polymerization to obtain the unsaturated olefin copolymer (A) or (A').

As the soluble vanadium compound forming the vanadium catalyst, vanadium compounds represented by the following general formula (v) or (vi), and the like are mentioned.

$$\text{VO}(OR)_a X_b \qquad (v)$$

$$\text{V}(OR)_c X_d \qquad (vi)$$

In the general formulae (v) and (vi), R is a hydrocarbon group, X is a halogen atom, and a, b, c and d are numbers respectively satisfying $0 \leq a \leq 3$, $0 \leq b \leq 3$, $2 \leq a \leq b \leq 3$, $0 \leq c \leq 4$, $0 \leq d \leq 4$, $3 \leq c+d \leq 4$.

As the soluble vanadium compound, an electron donor adduct of a soluble vanadium compound obtained by contacting the both with each other can also be used. As the organoaluminum compound forming the vanadium catalyst, the same compound as the organoaluminum compound forming the titanium catalyst can be used.

The metallocene compound of transition metal selected from Group IV of Periodic Table forming the metallocene catalyst is specifically represented by the following formula (VI).

$$M^1L^1_x \qquad (VI)$$

wherein $M^1$ is a transition metal selected from Group IV of Periodic Table, particularly, zirconium, titanium or hafnium, x is a valence of the transition metal $M^1$, and is a number of ligands $L^1$ coordinated to the transition metal, and $L^1$ is a ligand coordinated to the transition metal, wherein at least one ligand $L^1$ is a ligand having a cyclopentadienyl skeleton which may have a substituent.

Examples of the ligand $L^1$ having a cyclopentadienyl skeleton include cyclopentadienyl group, alkyl or cycloalkyl substituted cyclopentadienyl groups such as methylcyclopentadienyl group, ethylcyclopentadienyl group, n- or i-propylcyclopentadienyl group, n-, i-, sec- or t-butylcyclopentadienyl group, dimethylcyclopentadienyl group, methylpropylcyclopentadienyl group, methylbutylcyclopentadienyl group, methylbenzylcyclopentadienyl group and the like, and further, indenyl group, 4,5,6,7-tetrahydroindenyl group and fluorenyl group and the like. The above-described group having a cyclopentadienyl skeleton may be substituted by a halogen atom, trialkylsilyl group or the like.

When the compound represented by the general formula (VI) contains two or more groups having a cyclopentadienyl skeleton as the ligand $L^1$, two of the groups having a cyclopentadienyl group may be connected via an alkylene group such as ethylene, propylene and the like; a substituted alkylene group such as isopropylidene or diphenylmethylene and the like; a silylene group or a substituted silylene group such as dimethylsilylene group, diphenylsilylene group, methylphenylsilylene group and the like, to form a metallocene compound of bridge type.

As ligand $L^1$ other than the ligand having a cyclopentadienyl skeleton (ligand having no cyclopentadienyl group), hydrocarbon groups having 1 to 12 carbon atoms, alkoxy groups, aryloxy groups, sulfonic acid-containing group ($-SO_3R^a$ wherein $R^a$ is an alkyl group, alkyl group substituted with a halogen atom, aryl group, or aryl group substituted with a halogen atom or alkyl group), halogen atoms or hydrogen atom and the like are mentioned.

As the hydrocarbon group having 1 to 12 carbon atoms ligand $L^1$, an alkyl group, cycloalkyl group, aryl group, aralkyl group and the like are mentioned. More specifically, alkyl groups such as methyl group, ethyl group, n-propyl group, isopropyl group, n-butyl group, isobutyl group, sec-butyl group, t-butyl group, pentyl group, hexyl group, octyl group, decyl group, dodecyl group and the like; cycloalkyl groups such as a cyclopentyl group, cyclohexyl group and the like; aryl groups such as phenyl group, tolyl group and the like; aralkyl groups such as benzyl group, neophil group and the like, are mentioned.

As the alkoxy group (ligand $L^1$), methoxy group, ethoxy group, n-propoxy group and the like are mentioned. As the aryloxy group, a phenoxy group and the like are mentioned.

As the sulfonic acid-containing group ($-SO_3R^a$), methanesulfonato group, p-toluenesulfonato group, trifluoromethanesulfonato group, p-chlorobenzenesulfonato group and the like are mentioned. As the halogen atom, fluorine, chlorine, bromine, iodine and the like are mentioned.

The metallocene compound represented by the general formula (VI), where the valence of the transition metal is for example 4, is more specifically represented by the following general formula (VI').

$$R^2_k R^3_l R^4_m R^5_n M^1 \qquad (VI')$$

In the general formula (VI'), $M^1$ is a transition metal as in the general formula (VI), $R^2$ is a group having a cyclopentadienyl skeleton (ligand), $R^3$, $R^4$ and $R^5$ are each independently a group having cyclopentadienyl group or having no cyclopentadienyl group (ligand), k is an integer of 1 or more, and k+l+m+n=4.

The metallocene compounds comprising two ligands having a cyclopentadienyl skeleton in which $M^1$ is zirconium are exemplified below.

bis(cyclopentadienyl)zirconium monochloride monohydride, bis(cyclopentadienyl)zirconium dichloride, bis(1-methyl-3-butylcyclopentadienyl)zirconium bis(trifluoromethanesulfonate), bis(1,3-dimethylcyclopentadienyl)zirconium dichloride, ethylene-bis(indenyl)dimethylzirconium, ethylene-bis(indenyl)zirconium dichloride, isopropylidene(cyclopentadienyl-fluorenyl)zirconium dichloride, diphenylsilylene-bis(indenyl)zirconium dichloride, methylphenylsilylene-bis(indenyl)zirconium dichloride, rac-ethylene-bis(2-methyl-1-indenyl)zirconium dichloride, rac-dimethylsilylene-bis(2-methyl-1-indenyl)zirconium dichloride, rac-dimethylsilylene-bis(4,7-dimethyl-1-indenyl)zirconium dichloride, rac-dimethylsilylene-bis(2,4,7-trimethyl-1-indenyl)zirconium dichloride, rac-dimethylsilylene-bis(2,4,6-trimethyl-1-indenyl)zirconium dichloride, rac-dimethylsilylene-bis(4-phenyl-1-indenyl)zirconium dichloride, rac-dimethylsilylene-bis(2-methyl-4-phenyl-1-indenyl)zirconium dichloride, rac-dimethylsilylene-bis(2-methyl-4-(α-naphthyl)-1-indenyl)zirconium dichloride, rac-dimethylsilylene-bis(2-methyl-4-(β-naphthyl)-1-indenyl)zirconium dichloride, rac-dimethylsilylene-bis(2-methyl-4-(1-anthryl)-1-indenyl)zirconium dichloride, and the like.

There can also be exemplified metallocene compounds wherein in the above-described compounds, the zirconium metal is replaced by titanium metal or hafnium metal.

As the metallocene compound of bridge type, metallocene compounds represented by the following formula [A] are mentioned.

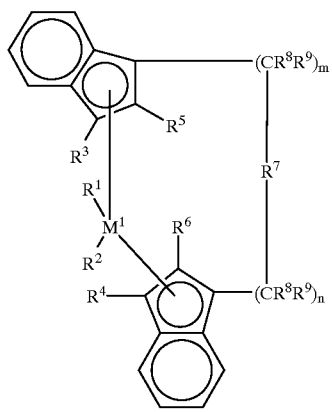

(A)

In the formula (A), $M^1$ represents a metal of Group IV of Periodic Table, for example, titanium, zirconium and hafnium.

$R^1$ and $R^2$ may be the same or different, and are each a hydrogen atom, an alkyl group having from 1 to 10, preferably from 1 to 3 carbon atoms, an alkoxy group having from 1 to 10, preferably from 1 to 3 carbon atoms, an aryl group having from 6 to 10, preferably from 6 to 8 carbon atoms, an aryloxy group having from 6 to 10, preferably from 6 to 8 carbon atoms, an alkenyl group having from 2 to 10, preferably from 2 to 4 carbon atoms, an arylalkyl group having from 7 to 40, preferably 7to 10 carbon atoms, an alkylaryl group having from 7 to 40, preferably from 7 to 12 carbon atoms, an arylalkenyl group having from 8 to 40, preferably from 8 to 12 carbon atoms, or halogen atom, preferably chlorine atom.

$R^3$ and $R^4$ may be the same or different, and are each a hydrogen atom, a halogen atom, preferably fluorine atom, chlorine atom or bromine atom, an alkyl group, which may be halogenated, having from 1 to 10, preferably from 1 to 4 carbon atoms, an aryl group having from 6 to 10, preferably from 6 to 8 carbon atoms, $-NR^{10}{}_2$, $-SR^{10}$, $-OSiR^{10}{}_3$, $-SiR^{10}{}_3$ or $-PR^{10}{}_2$ group, where $R^{10}$ is a halogen atom, preferably chlorine atom, or an alkyl group having from 1 to 10, preferably from 1 to 3 carbon atoms, or an aryl group having from 6 to 10, preferably from 6 to 8 carbon atoms.

$R^3$ and $R^4$ are particularly preferably a hydrogen atom.

$R^5$ and $R^6$ may be the same or different, preferably the same, and have the same definitions as for $R^3$ and $R^4$ providing that $R^5$ and $R^6$ are not a hydrogen atom. $R^5$ and $R^6$ are preferably an alkyl group, which may be halogenated, having 1 to 4 carbon atoms, specifically, methyl group, ethyl group, propyl group, isopropyl group, butyl group, isobutyl group, trifluoromethyl group and the like, and preferably a methyl group.

$R^7$ is

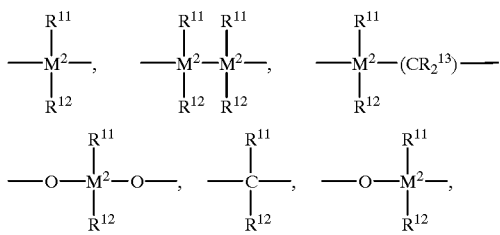

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$, where $R^{11}$, $R^{12}$ and $R^{13}$ may be the same or different, and are each a hydrogen atom, halogen atom, an alkyl group having from 1 to 10, preferably from 1 to 4 carbon atoms, and more preferably methyl group, a fluoroalkyl group having from 1 to 10 carbon atoms, preferably $CF_3$ group, an aryl group having from 6 to 10, preferably from 6 to 8 carbon atoms, a fluoroaryl group having from 6 to 10 carbon atoms, preferably pentafluorophenyl group, an alkoxy group having from 1 to 10, preferably from 1 to 4 carbon atoms, particularly preferably methoxy group, an alkenyl group having from 2 to 10, preferably from 2 to 4 carbon atoms, an arylalkyl group having from 7 to 40, preferably from 7 to 10 carbon atoms, an arylalkenyl group having from 8 to 40, preferably from 8 to 12 carbon atoms, or an alkylaryl group having from 7 to 40, preferably from 7 to 12 carbon atoms, and $R^{11}$ and $R^{12}$, or $R^{11}$ and $R^{12}$ may form together with the carbon atoms to which they are bonded a ring, $M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same or different and have the same definitions as for $R^{11}$.

m and n may be the same or different, and are each 0, 1 or 2, preferably 0 or 1, and m+n is 0, 1 or 2, preferably 0 or 1.

Particularly preferable metallocene compounds satisfying the above-described conditions are represented by the following formulae (i) to (iii).

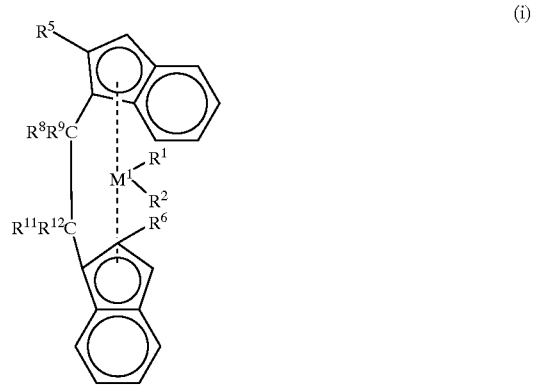

(i)

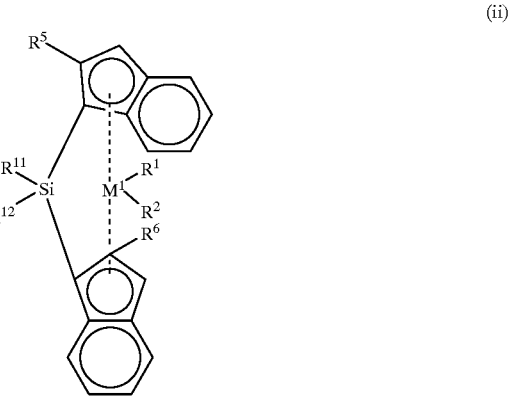

(ii)

-continued

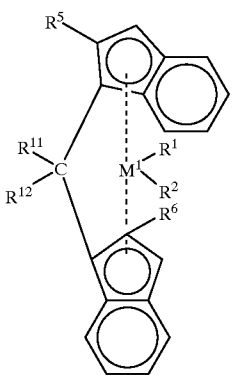

(iii)

In the above formulas (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{10}$, $R^{11}$ and $R^{12}$ have the same definitions as described above.

Of the compounds represented by the formulae (i), (ii) and (iii), the following compounds are particularly preferable.
  rac-dimethylmethylene-bis(indenyl)zirconium dichloride,
  rac-dimethylmethylene-bis(2-methyl-1-indenyl) zirconium dichloride,
  rac-diphenylmethylene-bis(2-methyl-1-indenyl) zirconium dichloride,
  rac-ethylene-bis(2-methyl-1-indenyl)zirconium dichloride,
  rac-dimethylsilylene-bis(2-methyl-1-indenyl)zirconium dichloride,
  rac-dimethylsilylene-bis(2-methyl-1-indenyl)zirconium dimethyl,
  rac-ethylene-bis(2-methyl-1-indenyl)zirconium dimethyl,
  rac-phenyl(methyl)silylene-bis(2-methyl-1-indenyl) zirconium dichloride,
  rac-diphenyl-silylene-bis(2-methyl-1-indenyl)zirconium dichloride,
  rac-methylethylene-bis(2-methyl-1-indenyl)zirconium dichloride, and
  rac-dimethylsilylene-bis(2-ethyl-1-indenyl)zirconium dichloride. These metallocene compounds can be produced by conventionally known methods (see, for example, Japanese Patent Laid-Open Application (JP-A) No. Hei 4-268307).

In the present invention, as the bridge type metallocene compound, a transition metal compound (metallocene compound) represented by the following formula (B) can also be used.

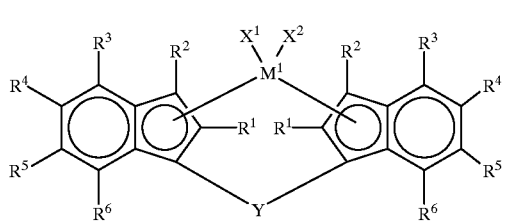

(B)

In the formula (B), $M^1$ is a transition metal atom of Group 4 of the periodic table, specifically, titanium, zirconium or hafnium.

$R^1$ and $R^2$ may be the same or different, and are each hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include the above-exemplified hydrocarbon groups which are substituted with halogen atoms.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the oxygen-containing groups include hydroxy groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing group.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms (methyl, ethyl or propyl). $R^2$ is preferably hydrogen or a hydrocarbon group, particularly preferably hydrogen or a hydrocarbon group of 1 to 3 carbon atoms (methyl, ethyl or propyl).

$R^3$, $R^4$, $R^5$ and $R^6$ may be the same or different, and are each hydrogen, a halogen atom, a hydrocarbon group of 1 to 20 carbon atoms or a halogenated hydrocarbon group of 1 to 20 carbon atoms. Of these, preferred are hydrogen, the hydrocarbon group or the halogenated hydrocarbon group. At least one combination of $R^3$ and $R^4$, $R^4$ and $R^5$, or $R^5$ and $R^6$ may form together with the carbon atoms to which they are bonded a monocyclic aromatic ring.

When there are two or more hydrocarbon groups or halogenated hydrocarbon groups, excluding the groups for forming the aromatic ring, they may be bonded to each other to form a ring. When $R^6$ is a substituent other than the aromatic group, it is preferably hydrogen. Examples of the halogen atoms, the hydrocarbon groups of 1 to 20 carbon atoms and the halogenated hydrocarbon groups of 1 to 20 carbon atoms are those described for $R^1$ and $R^2$.

As the ligand which contains a monocyclic aromatic ring formed by at least one combination of $R^3$ and $R^4$, $R^4$ and $R^5$, or $R^5$ and $R^6$, as mentioned above, and is coordinated to $M^1$, there can be mentioned the following ones.

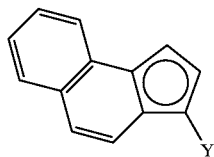

(1)

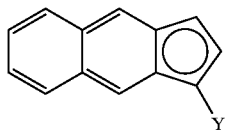

(2)

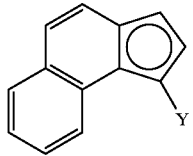

(3)

Of these, preferred is the ligand represented by the formula (1).

The aromatic ring mentioned above may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms for substituting the aromatic ring are those described for $R^1$ and $R^2$.

$X^1$ and $X^2$ may be the same or different, and are each hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are those described for $R^1$ and $R^2$.

Examples of the sulfur-containing groups include those described for $R^1$ and $R^2$; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$—, where $R^7$ is hydrogen, a halogen atom, a hydrocarbon group of 1 to 20 carbon atoms or a halogenated hydrocarbon group of 1 to 20 carbon atoms.

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene.

Examples of the divalent halogenated hydrocarbon groups include the above-mentioned divalent hydrocarbon groups of 1 to 20 carbon atoms, which are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl) silylene, di(cyclohexyl)silylene, methylphenylsilylene, diphenylsilylene, di(p-tolyl)silylene and di(p-chlorophenyl) silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-mentioned divalent silicon-containing groups.

Examples of the divalent tin-containing groups include those wherein silicon is replaced with tin in the above-mentioned divalent silicon-containing groups.

$R^7$ is a halogen atom, a hydrocarbon group of 1 to 20 carbon atoms or a halogenated hydrocarbon group of 1 to 20 carbon atoms, examples of which are those described for $R^1$ and $R^2$.

Of the above groups, preferred are divalent silicon-containing groups, divalent germanium-containing groups and divalent tin-containing group, and more preferred are divalent silicon-containing groups. Of these, particularly preferred are alkylsilylene, alkylarylsilylene and arylsilylene.

Listed below are examples of the transition metal compounds represented by the formula (B).

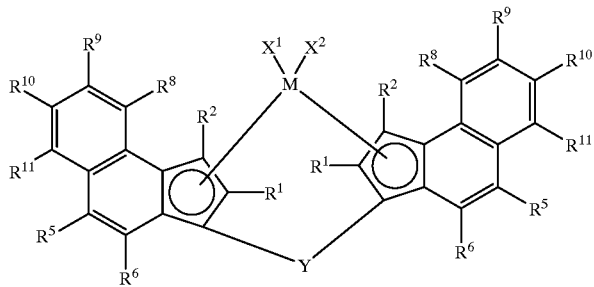

| R¹ | R² | R⁵ | R⁶ | R⁸ | R⁹ | R¹⁰ | R¹¹ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiMePh | Cl | Cl | Zr |
| CH₃ | H | H | H | H | H | H | H | SiPh₂ | Cl | Cl | Zr |
| CH₃ | H | H | H | H | H | H | H | Si(p-tolyl)₂ | Cl | Cl | Zr |
| CH₃ | H | H | H | H | H | H | H | Si(pClPh)₂ | Cl | Cl | Zr |
| CH₃ | H | H | H | H | H | H | H | C₂H₅ | Cl | Cl | Zr |
| CH₃ | H | H | H | H | H | H | H | GeMe₂ | Cl | Cl | Zr |
| CH₃ | H | H | H | H | H | H | H | SnMe₂ | Cl | Cl | Zr |
| CH₃ | H | H | H | H | H | H | H | SiMe₂ | Br | Br | Zr |
| CH₃ | H | H | H | H | H | H | H | SiMe₂ | Cl | OSO₂CH₃ | Zr |
| CH₃ | H | H | H | H | H | H | H | SiMe₂ | Cl | SO₂CH₃ | Zr |
| CH₃ | H | H | H | H | H | H | H | SiMe₂ | Cl | Cl | Ti |
| CH₃ | H | H | H | H | H | H | H | SiMe₂ | Cl | Cl | Hf |
| C₂H₅ | H | H | H | H | H | H | H | SiMe₂ | Cl | Cl | Zr |
| nC₃H₇ | H | H | H | H | H | H | H | SiMe₂ | Cl | Cl | Zr |
| Ph | H | H | H | H | H | H | H | SiMe₂ | Cl | Cl | Zr |
| CH₃ | CH₃ | H | H | H | H | H | H | SiMe₂ | Cl | Cl | Zr |
| CH₃ | CH₃ | H | H | H | H | H | H | SiPh2 | Cl | Cl | Zr |
| CH₃ | CH₃ | CH₃ | H | H | H | H | H | SiMe₂ | Cl | Cl | Zr |
| CH₃ | H | Cl | H | H | H | H | H | SiMe₂ | Cl | Cl | Zr |
| CH₃ | H | CH₃ | H | H | H | H | H | SiMe₂ | Cl | Cl | Zr |
| CH₃ | H | C₂H₅ | H | H | H | H | H | SiMe₂ | Cl | Cl | Zr |
| CH₃ | H | Ph | H | H | H | H | H | SiMe₂ | Cl | Cl | Zr |
| CH₃ | H | H | CH₃ | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*¹ | CH₃ | H | H | H | CH₂*¹ | SiMe₂ | Cl | Cl | Zr |
| CH₃ | H | H | H | H | H | H | Ph | SiMe₂ | Cl | Cl | Zr |

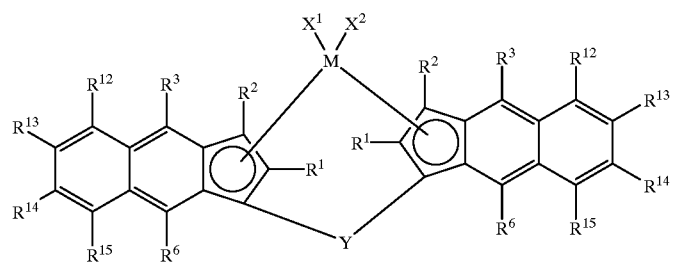

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

-continued

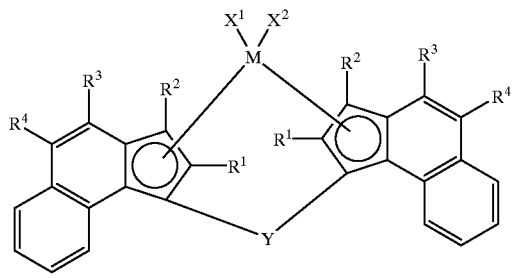

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |
| CH₃ | CH₃ | H | CH₃ | SiMe₂ | Cl | Cl | Zr |
| CH₃ | CH₃ | CH₃ | CH₃ | SiMe₂ | Cl | Cl | Zr |

*¹$R^5$ and $R^{11}$ are bonded to each other to form a five-membered ring.
*²$R^3$ and $R^{12}$, and $R^6$ and $R^{15}$ are bonded to each other to form a five-memebered ring, respectively.
Me: methyl;
Et: ethyl;
Ph: phenyl.

Also employable in the invention are transition metal compounds wherein zirconium is replaced with titanium or hafnium in the above-mentioned compounds.

The transition metal compounds mentioned above are used generally in the form of racemic modification as the olefin polymerization catalyst component, but they can be used also in the form of R type or S type.

The indene derivative ligands for the transition metal compounds can be synthesized in accordance with ordinary organic synthesis through, for example, the reaction route described below.

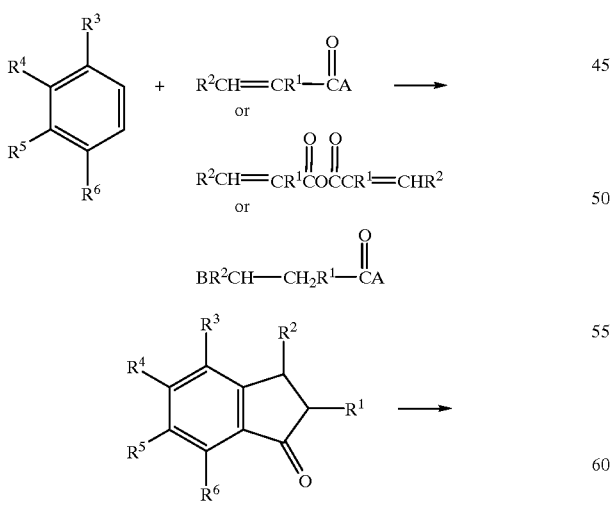

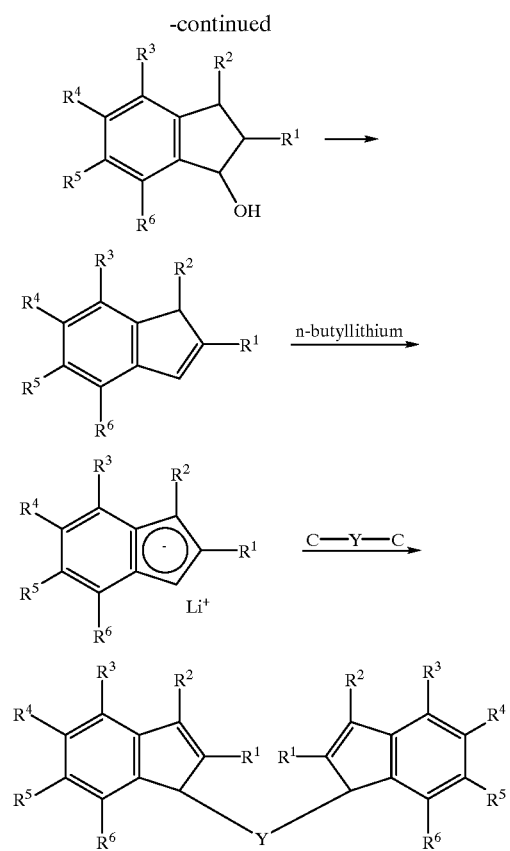

wherein A, B, C are each halogen.

The transition metal compounds used in the invention can be synthesized from these indene derivatives in accordance with conventionally known processes, for example, described in Japanese Patent Laid-Open Publication No. 268307/1992.

In the present invention, a bridge type transition metal compound (metallocene compound) represented by the following formula (C) is also employable.

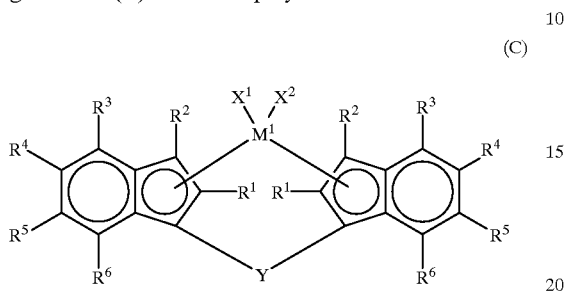

(C)

In the formula (C), M, $R^1$, $R^2$, $R^3$, $R^4$, $R^5$ and $R^6$ have the same meanings described for those in the aforesaid formula (B).

Of $R^3$, $R^4$, $R^5$ and $R^6$, two groups including $R^3$ are preferably alkyl groups, and it is more preferred that $R^3$ and $R^5$, or $R^3$ and $R^6$ are alkyl groups. These alkyl groups are preferably secondary or tertiary alkyl groups, and may be substituted with halogen atoms or silicon-containing groups. As the halogen atoms and the silicon-containing groups, there can be mentioned those substituents as described for $R^1$ and $R^2$.

Of the groups $R^3$, $R^4$, $R^5$ and $R^6$, other groups than the alkyl groups are each preferably hydrogen.

Examples of the hydrocarbon groups of 1 to 20 carbon atoms include straight chain and branched chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic hydrocarbon ring other than the aromatic ring.

Examples of the halogen atoms are those described for $R^1$ and $R^2$.

$X^1$, $X^2$, Y and $R^7$ have the same meanings described for those in the aforesaid formula (B).

Listed below are examples of the metallocene compounds (transition metal compounds) represented by the formula (C).

rac-Dimethylsilylene-bis(4,7-dimethyl-1-indenyl)zirconium dichloride,
rac-Dimethylsilylene-bis(2,4,7-trimethyl-1-indenyl)zirconium dichloride,
rac-Dimethylsilylene-bis(2,4,6-trimethyl-1-indenyl)zirconium dichloride,
rac-Dimethylsilylene-bis(2,5,6-trimethyl-1-indenyl)zirconium dichloride,
rac-Dimethylsilylene-bis(2,4,5,6-tetramethyl-1-indenyl)zirconium dichloride,
rac-Dimethylsilylene-bis(2,4,5,6,7-pentamethyl-1-indenyl)zirconium dichloride,
rac-Dimethylsilylene-bis(2-methyl-4-n-propyl-7-methyl-1-indenyl)zirconium dichloride,
rac-Dimethylsilylene-bis(4-i-propyl-7-methyl-1-indenyl)zirconium dichloride,
rac-Dimethylsilylene-bis(2-methyl-4-i-propyl-7-methyl-1-indenyl)zirconium dichloride,
rac-Dimethylsilylene-bis(2-methyl-4-i-propyl-6-methyl-1-indenyl)zirconium dichloride,
rac-Dimethylsilylene-bis(2-methyl-4-methyl-6-i-propyl-1-indenyl)zirconium dichloride,
rac-Dimethylsilylene-bis(2-methyl-4-i-propyl-5-methyl-1-indenyl)zirconium dichloride,
rac-Dimethylsilylene-bis(2-methyl-4,6-di(i-propyl)-1-indenyl)zirconium dichloride,
rac-Dimethylsilylene-bis(2-methyl-4,6-di(i-propyl)-7-methyl-1-indenyl)zirconium dichloride,
rac-Dimethylsilylene-bis(2-methyl-4-i-butyl-7-methyl-1-indenyl)zirconium dichloride,
rac-Dimethylsilylene-bis(2-methyl-4-sec-butyl-7-methyl-1-indenyl)zirconium dichloride,
rac-Dimethylsilylene-bis(2-methyl-4,6-di(sec-butyl)-1-indenyl)zirconium dichloride,
rac-Dimethylsilylene-bis(2-methyl-4-tert-butyl-7-methyl-1-indenyl)zirconium dichloride,
rac-Dimethylsilylene-bis(2-methyl-4-cyclohexyl-7-methyl-1-indenyl)zirconium dichloride,
rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichloride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl)zirconium dichloride,
rac-Di(cyclohexyl)silylene-bis(2-methyl-4-i-propyl-7-methyl-1-indenyl)zirconium dichloride,
rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1-indenyl)zirconium dichloride,
rac-Diphenylsilylene-bis(2-methyl-4-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl-4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride, rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-6-methyl-1-indenyl)zirconium dichloride,
rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl-1-indenyl)zirconium dichloride.

Also employable in the invention are transition metal compounds wherein zirconium is replaced with titanium metal or hafnium metal in the above-mentioned compounds.

The transition metal compounds mentioned above are used generally in the form of racemic modification, but they can be used also in the form of R type or S type.

The indene derivative ligands for the transition metal compounds can be synthesized in accordance with ordinary organic synthesis through, for example, the aforementioned reaction route.

The transition metal compounds (metallocene compounds) represented by the formula (C) can be synthesized from these indene derivatives in accordance with conventionally known processes, for example, described in Japanese Patent Laid-Open Publication No. 268307/1992.

In the present invention, a bridge type transition metal compound (metallocene compound) represented by the following formula (D) is also employable.

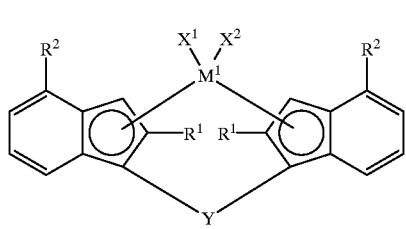

(D)

In the formula (D), $M^1$, $R^1$, $X^1$, $X^2$ and Y have the same meanings as described for those in the aforesaid formula (B) or (C).

$R^1$ is preferably a hydrocarbon group, more preferably a hydrocarbon group of 1 to 4 carbon atoms, e.g., methyl, ethyl, propyl and butyl.

$X^1$ and $X^2$ are each preferably a halogen atom or a hydrocarbon group of 1 to 20 carbon atoms.

$R^2$ is an aryl group of 6 to 16 carbon atoms, for example, phenyl, α-naphthyl, β-naphthyl, anthracenyl, phenanthryl, pyrenyl, acenaphthyl, phenalenyl (perinaphthenyl) or aceanthrylenyl. Of these, phenyl or naphthyl is preferred. These aryl groups may be substituted with halogen atoms, hydrocarbon groups of 1 to 20 carbon atoms or halogenated hydrocarbon groups of 1 to 20 carbon atoms such as described for $R^1$.

Listed below are examples of the transition metal compounds (metallocene compounds) represented by the formula (D).

rac-Dimethylsilylene-bis(4-phenyl-1-indenyl)zirconium dichloride,
rac-Dimethylsilylene-bis(2-methyl-4-phenyl-1-indenyl) zirconium dichloride,
rac-Dimethylsilylene-bis(2-methyl-4-(α-naphthyl)-1-indenyl)zirconium dichloride,
rac-Dimethylsilylene-bis(2-methyl-4-(β-naphthyl)-1-indenyl) zirconium dichloride,
rac-Dimethylsilylene-bis(2-methyl-4-(1-anthracenyl)-1-indenyl)zirconium dichloride,
rac-Dimethylsilylene-bis(2-methyl-4-(2-anthracenyl)-1-indenyl)zirconium dichloride,
rac-Dimethylsilylene-bis(2-methyl-4-(9-anthracenyl)-1-indenyl)zirconium dichloride,
rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichloride,
rac-Dimethylsilylene-bis(2-methyl-4-(pentafluorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(o,p-dichlorophenyl)phenyl-1-indenyl)zirconium dichloride,
rac-Dimethylsilylene-bis(2-methyl-4-(p-bromophenyl)-1-indenyl)zirconium dichloride,
rac-Dimethylsilylene-bis(2-methyl-4-(p-tolyl)-1-indenyl) zirconium dichloride,
rac-Dimethylsilylene-bis(2-methyl-4-(m-tolyl)-1-indenyl) zirconium dichloride,
rac-Dimethylsilylene-bis(2-methyl-4-(o-tolyl)-1-indenyl) zirconium dichloride,
rac-Dimethylsilylene-bis(2-methyl-4-(o,o'-dimethylphenyl)-1-indenyl) zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl) zirconium dichloride,
rac-Dimethylsilylene-bis(2-methyl-4-(p-benzylphenyl)-1-indenyl) zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylphenyl)-1-indenyl)zirconium dichloride,
rac-Dimethylsilylene-bis(2-methyl-4-(m-trimethylsilylphenyl)-1-indenyl)zirconium dichloride,
rac-Dimethylsilylene-bis(2-ethyl-4-phenyl-1-indenyl) zirconium dichloride,
rac-Diphenylsilylene-bis(2-ethyl-4-phenyl-1-indenyl) zirconium dichloride,
rac-Dimethylsilylene-bis(2-phenyl-4-phenyl-1-indenyl) zirconium dichloride,
rac-Dimethylsilylene-bis(2-n-propyl-4-phenyl-1-indenyl) zirconium dichloride,
rac-Diethylsilylene-bis(2-methyl-4-phenyl-1-indenyl) zirconium dichloride,
rac-Di-(i-propyl)silylene-bis(2-methyl-4-phenyl-1-indenyl) zirconium dichloride,
rac-Di-(n-butyl)silylene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride, rac-Diphenylsilylene-bis(2-methyl-4-phenyl-1-indenyl)
zirconium dichloride,
rac-Di(p-tolyl)silylene-bis(2-methyl-4-phenyl-1-indenyl)
zirconium dichloride,
rac-Di(p-chlorophenyl)silylene-bis(2-methyl-4-phenyl-1-
indenyl)zirconium dichloride,
rac-Methylene-bis(2-methyl-4-phenyl-1-indenyl)
zirconium dichloride,
rac-Ethylene-bis(2-methyl-4-phenyl-1-indenyl)zirconium
dichloride,
rac-Dimethylgermylene-bis(2-methyl-4-phenyl-1-
indenyl)zirconium dichloride,
rac-Dimethylstannylene-bis(2-methyl-4-phenyl-1-
indenyl)zirconium dichloride,
rac-Dimethylsilylene-bis(2-methyl-4-phenyl-1-indenyl)
zirconium dibromide,
rac-Dimethylsilylene-bis(2-methyl-4-phenyl-1-indenyl)
zirconium dimethyl,
rac-Dimethylsilylene-bis(2-methyl-4-phenyl-1-indenyl)
zirconium methylchloride,
rac-Dimethylsilylene-bis(2-methyl-4-phenyl-1-indenyl)
zirconium chloride $SO_2Me$, and
rac-Dimethylsilylene-bis(2-methyl-4-phenyl-1-indenyl)
zirconium chloride $OSO_2Me$.

Also employable in the invention are transition metal compounds wherein zirconium is replaced with titanium metal or hafnium metal in the above-mentioned compounds.

The transition metal compounds represented by the formula (D) can be prepared in accordance with "Journal of Organometallic Chem.", 288(1985), pp. 63–67, and European Patent Publication No. 0,320,762 (specification and examples), for example, in the following manner.

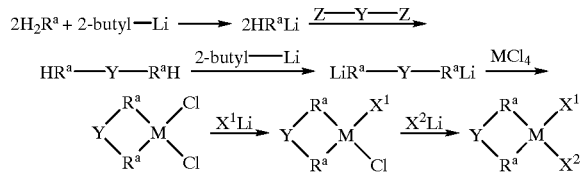

wherein Z is Cl, Br, I or o-tosyl, and $H_2R^a$ is

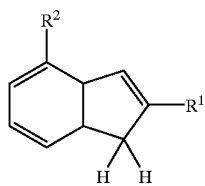

The transition metal compounds (D) are used generally in the form of racemic modification, but they can be used also in the form of R type or S type.

In the present invention, a compound represented by the following formula (VII) can be also employed as the metallocene compound.

$$L^2M^3X_2 \quad (VII)$$

wherein, $M^3$ is a metal of Group 4 of the periodic table or a metal of lanthanide series;

$L^2$ is a derivative of delocalization π bond group and imparts restraint geometrical shape to the metal $M^3$ active site; and the X's may be the same or different, and are each hydrogen, halogen, a hydrocarbon group, a silyl group or a germyl group, each having 20 or less carbon, silicon or germanium atoms.

Of the compounds of the formula (VII), preferred are compounds represented by the following formula (VII').

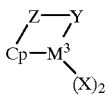

(VII')

wherein $M^3$ is titanium, zirconium or hafnium; X is the same as described above;

Cp is a substituted cyclopentadienyl group which is π-bonded to $M^3$ and has a substituent Z;

Z is oxygen, sulfur, boron or an element of Group 14 of the periodic table (e.g., silicon, germanium or tin);

Y is a ligand containing nitrogen, phosphorus, oxygen or sulfur; and

Z and Y may form together a condensed ring.

Examples of the compounds represented by the formula (VII') include (dimethyl(t-butylamide)(tetramethyl-$\eta^5$-cyclopentadienyl)silane)titanium dichloride and ((t-butylamide)(tetramethyl-$\eta^5$-cyclopentadienyl)-1,2-ethanediyl)titanium dichloride.

The metallocene compounds mentioned above can be used singly or in combination.

Preferred metallocene compound represented by the formula (VII) or (VII') contains a titanium as a center metal.

Of the above-mentioned various metallocene compounds, particularly preferred is the metallocene compound represented by the formula (VII) or (VII').

The metallocene compound can be used by being supported on a particulate carrier.

Examples of the particulate carriers include inorganic carriers, such as $SiO_2$, $Al_2O_3$, $B_2O_3$, MgO, $ZrO_2$, CaO, $TiO_2$, ZnO, $SnO_2$, BaO and ThO; and organic carriers, such as polyethylene, polypropylene, poly-1-butene, poly-4-methyl-1-pentene and a styrene/divinylbenzene copolymer. These particulate carriers can be used singly or in combination.

Next, the organoaluminum oxy-compound (b-2) and the ionizing ionic compound which form the metallocene catalysts are described.

The organoaluminum oxy-compound (b-2) may be either aluminoxane conventionally known or a benzene-insoluble organoaluminum oxy-compound exemplified in Japanese Patent Laid-Open Publication No. 78687/1990.

The conventionally known aluminoxane is specifically represented by the following formula:

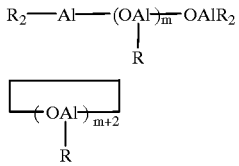

wherein R is a hydrocarbon group, such as methyl, ethyl, propyl or butyl, preferably methyl or ethyl, particularly preferably methyl; and m is an integer of 2 or more, preferably an integer of 5 to 40.

The aluminoxane may be formed from mixed alkyloxyaluminum units consisting of alkyloxyaluminum units represented by the formula (OAl($R^1$)) and alkyloxyaluminum units represented by the formula (OAl($R^2$)) (wherein $R^1$ and $R^2$ are each the same hydrocarbon group as described for R, and $R^1$ and $R^2$ are different from each other).

The organoaluminum oxy-compound may contain a small amount of an organic compound of other metal than aluminum.

Examples of the ionizing ionic compounds includes Lewis acid, ionic compounds, borane compounds and carborane compounds.

The Lewis acid is, for example, a compound represented by the formula $BR_3$ (where each R is a phenyl group which may have a substituent such as fluorine, methyl or trifluoromethyl, or a fluorine atom). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

Examples of the ionic compounds include trialkyl-substituted ammonium salts, N,N,-dialkylanilinium salts, dialkylammonium salts and triarylphosphonium salts. Particular examples of the trialkyl-substituted ammonium salts include triethylammoniumtetra(phenyl)boron, tripropylammoniumtetra(phenyl)boron and tri(n-butyl) ammoniumtetra(phenyl)boron. Particular examples of the dialkylammonium salts include di(1-propyl)ammoniumtetra(pentafluorophenyl)boron and dicyclohexylammoniumtetra(phenyl)boron. Also employable as the ionic compounds are triphenylcarbeniumtetrakis(pentafluorophenyl)borate, N,N-dimethylaniliniumtetrakis(pentafluorophenyl)borate and ferroceniumtetrakis(pentafluorophenyl)borate.

Examples of the borane compounds include decaborane (14), bis[tri(n-butyl)ammonium]nonaborate, bis[tri(n-butyl) ammonium]decaborate, and salts of metallic borane anions such as bis[tri(n-butyl)ammonium]bis (dodecahydrididododecaborate)-nickelate(III).

Examples of the carborane compounds include 4-carbanonaborane(14), 1,3-dicarbanonaborane(13), and salts of metallic carborane anions such as bis[tri(n-butyl) ammonium]bis(undecahydrido-7-carbaundecaborate) nickelate(IV).

The ionizing ionic compounds mentioned above can be used singly or in combination.

The organoaluminum oxy-compound or the ionizing ionic compound can be used by being supported on the aforesaid particulate carrier.

In the preparation of the catalyst, the above-mentioned organoaluminum compounds for forming the titanium catalyst may be used together with the organoaluminum oxy-compound or the ionizing ionic compound.

The unsaturated olefin copolymers (A) and (A') employable in the invention can be usually obtained by copolymerizing ethylene (i), an aromatic vinyl compound (ii) and a non-conjugated polyene (iii) and, if necessary, an α-olefin (iv) in the presence of the above catalyst for olefin polymerization. In this case, a hydrocarbon medium is generally used, but an α-olefin may also be used as the medium. The copolymerization can also be performed by any method, such as batch method and continuous method. In case of performing the copolymerization by using the batch method, the above catalyst is used in the following concentration.

When a titanium catalyst comprising a solid titanium catalyst component and an organoaluminum compound is used as the catalyst, the solid titanium catalyst component is used in an amount of usually about 0.001 to 1.0 mmol, preferably about 0.005 to 0.5 mmol, in terms of titanium atom per liter of the polymerization volume. Furthermore, the organoaluminum compound is used in an amount of usually about 10 to 500 mol, preferably 20 to 200 mol, as a metal atom in the organoaluminum compound per mol of titanium atom in the solid titanium catalyst component. When an electron donor is used, it is used in an amount of usually about 0.001 to 10 mol, preferably about 0.01 to 2 mol, particularly preferably about 0.05 to 1 mol, per mol of metal atom in the organoaluminum compound.

When a vanadium catalyst comprising a soluble vanadium compound and an organoaluminum compound is used as the catalyst, the concentration of the soluble vanadium compound in the polymerization system is usually 0.01 to 5 mmol, preferably 0.05 to 3 mmol, per liter of the polymerization volume. The soluble vanadium compound is preferably fed in a concentration of 10 times or less, preferably 1 to 70 times, more preferably 1 to 5 times, of the concentration of the soluble vanadium compound in the polymerization system. The organoaluminum compound is fed in a molar ratio (Al/V, aluminum atom to vanadium atom in the polymerization system) of 2 or more, preferably 2 to 50, more preferably 3 to 20.

The soluble vanadium compound and organoaluminum compound are usually fed after diluting with the above hydrocarbon solvent and/or liquid ethylene, α-olefin and non-conjugated polyene. In this case, the soluble vanadium compound is desirably diluted to the above concentration, but the organoaluminum compound is desirably fed after adjusting to any concentration, e.g. 50 times or less of the concentration in the polymerization system.

When the metallocene catalyst is used as the catalyst, the metallocene compound in the polymerization system is used in an amount of usually 0.00005 to 0.1 mmol, preferably 0.0001 to 0.05 mmol, per liter of the polymerization volume. The organoaluminum compound is used in a molar ratio (Al/M, aluminum atom (Al) to transition metal atom (M) in the metallocene compound) of 1 to 10000, preferably 10 to 5000.

The ionizing ionic compound is used in a molar ratio of ionizing ionic compound to metallocene compound (ionizing ionic compound/metallocene compound) of 0.5 to 20, preferably 1 to 10.

When the organoaluminum compound is used, it is used in an amount of usually about 0 to 5 mmol, preferably about 0 to 2 mmol, per liter of the polymerization volume.

When ethylene (i), an aromatic vinyl compound (ii) and a non-conjugated polyene (iii) and, if necessary, an α-olefin (iv) are copolymerized in the presence of a titanium catalyst, the copolymerization is performed under the conditions of a temperature of usually −20 to +150° C., preferably 0 to 120° C., more preferably 0 to 100° C., and a pressure of usually more than 0 and not more than 7.8 MPa (80 kgf/cm², gauge pressure), preferably more than 0 and not more than 4.9 MPa (50 kgf/cm², gauge pressure).

When ethylene (i), an aromatic vinyl compound (ii) and a non-conjugated polyene (iii) and, if necessary, an α-olefin (iv) are copolymerized in the presence of a vanadium catalyst, the copolymerization is performed under the conditions of a temperature of usually −50 to +100° C., preferably −30 to +80° C., more preferably −20 to +60° C., and a pressure of usually more than 0 and not more than 4.9 MPa (50 kgf/cm², gauge pressure), preferably more than 0 and not more than 2.0 MPa (20 kgf/cm², gauge pressure).

When ethylene (i), an aromatic vinyl compound (ii) and a non-conjugated polyene (iii) and, if necessary, an α-olefin (iv) are copolymerized in the presence of a metallocene catalyst, the copolymerization is performed under the conditions of a temperature of usually −20 to 150° C., preferably 0 to 120° C., more preferably 0 to 100° C., and a pressure of usually more than 0 and not more than 80 kgf/cm$^2$, preferably more than 0 and not more than 50 kgf/cm$^2$.

Ethylene (i), an aromatic vinyl compound (ii) and a non-conjugated polyene (iii) and, if necessary, an α-olefin (iv) are fed to the polymerization system in such amounts that the unsaturated olefin copolymer (A) or unsaturated olefin copolymer (A') having a specific composition as described above can be obtained. In the copolymerization, a molecular weight modifier such as hydrogen can also be used.

When the ethylene (i), aromatic vinyl compound (ii) and non-conjugated polyene (iii) and, if necessary, α-olefin (iv) are copolymerized as described above, the unsaturated olefin copolymer (A) or unsaturated olefin copolymer (A') is usually obtained as a polymer solution containing the same. This polymer solution is treated by a normal method, thereby obtaining the unsaturated olefin copolymer (A) or (A').

(B) Diene Rubber

The diene rubber (B) for use in the invention is a conventional diene rubber, and examples thereof include natural rubber (NR), isoprene rubber (IR), styrene/butadiene rubber (SBR), butadiene rubber (BR), chloroprene rubber (CR) and acrylonitrile/butadiene rubber (NBR).

As the natural rubber (NR), natural rubber standardized by "Green Book" (standard of international quality and packaging of natural rubber of various classes) is generally employed.

As the isoprene rubber (IR), isoprene rubber having a specific gravity of 0.91 to 0.94 and a Mooney viscosity [$ML_{1+4}$(100° C.)] of 30 to 120 is generally employed.

As the styrene/butadiene rubber (SBR), styrene/butadiene rubber having a specific gravity of 0.91 to 0.98 and a Mooney viscosity [$ML_{1+4}$(100° C.)] of 20 to 120 is generally employed.

As the butadiene rubber (BR), butadiene rubber having a specific gravity of 0.90 to 0.95 and a Mooney viscosity [$ML_{1+4}$(100° C.)] of 20 to 120 is generally employed.

These diene rubbers can be used singly or in combination of two or more kinds.

Of the above diene rubbers, preferably used are isoprene type rubbers having good balance of mechanical strength, namely, natural rubber and isoprene rubber.

(C) Carbon Black

As the carbon black (C), carbon black generally used for tire side wall can be used in the invention without specific limitation, and examples thereof include SRF, GPF, FEF, HAF, ISAF, SAF, FT and MT.

(D) Vulcanizing Agent

The vulcanizing agent (D) employable in the invention is, for example, sulfur or a sulfur compound.

Examples of sulfur include powdered sulfur, precipitated sulfur, colloidal sulfur, surface-treated sulfur and insoluble sulfur.

Examples of the sulfur compounds include sulfur chloride, sulfur dichloride and high-molecular polysulfides. Also employable are sulfur compounds which release active sulfur at the vulcanizing temperature to vulcanize the composition such as morpholine disulfide, alkylphenol disulfide, tetramethylthiuram disulfide, dipentamethylenethiuram tetrasulfide and selenium dimethyldithiocarbonate.

Of these, powdered sulfur is preferably employed.

An organic peroxide is also employable as the vulcanizing agent (D). Examples of the organic peroxides include alkyl peroxides, such as dicumyl peroxide, di-tert-butyl peroxide, di-tert-butylperoxy-3,3,5-trimethylcyclohexane, tert-butyldicumyl peroxide, di-tert-amyl peroxide, 2,5-dimethyl-2,5-di(tert-butylperoxy)hexyne-3,2,5-dimethyl-2,5-di (benzoylperoxy)hexane, 2,5-dimethyl-2,5-di(tert-butylperoxy)hexane, α,α-bis(tert-butylperoxy-m-isopropyl) benzene and tert-butyl hydroperoxide; peroxy esters, such as tert-butyl peroxyacetate, tert-butyl peroxyisobutyrate, tert-butyl peroxypivalate, tert-butyl peroxymaleate, tert-butyl peroxyneodecanoate, tert-butyl peroxybenzoate and di-tert-butyl peroxyphthalate; and ketone peroxides, such as dicyclohexanone peroxide. These organic peroxides can be used singly or in combination.

Of these, preferred are organic peroxides having a temperature, at which the half-life period thereof is one minute, of 130 to 200° C., for example, dicumyl peroxide, di-tert-butyl peroxide, di-tert-butylperoxy-3,3,5-trimethylcyclohexane, tert-butyldicumyl peroxide, di-tert-amyl peroxide and tert-butyl hydroperoxide.

Of the various vulcanizing agents mentioned above, sulfur or the sulfur compound, especially sulfur, is preferable as the vulcanizing agent (D), because a rubber composition for a tire side wall having excellent properties can be obtained.

Rubber Composition for Tire Side Wall

The rubber composition for tire side wall according to the invention comprises the unsaturated olefin copolymer (A), the diene rubber (B), and optionally, carbon black (C) and/or the vulcanizing agent (D).

In the rubber composition, the unsaturated olefin copolymer (A) and the diene rubber (B) are desirably present in a ratio [(A)/(B)] by weight of 20/80 to 80/20, preferably 20/80 to 70/30, more preferably 20/80 to 60/40.

The carbon black (C) is used in an amount of usually 30 to 120 parts by weight, preferably 40 to 100 parts by weight, more preferably 50 to 90 parts by weight, based on 100 parts by weight of the total amount of the unsaturated olefin copolymer (A) and the diene rubber (B).

When the vulcanizing agent (D) is sulfur or the sulfur compound, the vulcanizing agent (D) is used in an amount of usually 0.1 to 10 parts by weight, preferably 0.5 to 5 parts by weight, based on 100 parts by weight of the total amount of the unsaturated olefin copolymer (A) and the diene rubber (B).

When the vulcanizing agent (D) is an organic peroxide, the vulcanizing agent (D) is used in an amount of usually 0.05 to 15 parts by weight, preferably 0.15 to 5 parts by weight, based on 100 parts by weight of the total amount of the unsaturated olefin copolymer (A) and the diene rubber (B).

If the amount of the unsaturated olefin copolymer is in the above range, ozone crack hardly takes place in the tire side wall formed from the resulting composition and mechanical strength high enough for tire can be maintained.

If the carbon black (C) is used in the above-mentioned amount, the tire side wall obtained from the resulting rubber composition has excellent abrasion resistance and dynamic fatigue resistance.

The rubber composition for tire side wall according to the invention can be prepared by mixing the unsaturated olefin copolymer (A), the diene rubber (B), the carbon black (C) and the vulcanizing agent (D) in accordance with a conventional mixing method for rubber-like polymers, for example, using a mixer such as a Banbury mixer. In the present invention, various ingredients known as rubber compounding ingredients can be used in addition to the above-mentioned components, within limits not prejudicial to the object of the present invention.

Examples of the rubber compounding ingredients include softening agents; rubber reinforcing agents, such as finely divided silicic acid; fillers, such as calcium carbonate light, calcium carbonate heavy, talc, clay and silica; tackifiers; waxes; binder resins; zinc oxide; antistatic agents; ozone crack inhibitors; processing assistants; and vulcanization accelerators. These compounding ingredients can be used singly or in combination of two or more kinds.

As the softening agents, those generally used for rubbers can be widely used. Examples thereof include petroleum type softening agents, such as process oil, lubricating oil, paraffin, liquid paraffin, petroleum asphalt and vaseline; coal tar type softening agents, such as coal tar and coal tar pitch; fatty oil type softening agents, such as castor oil, linseed oil, rapeseed oil and coconut oil; tall oil; factice; waxes, such as beeswax, carnauba wax and lanolin; fatty acids and fatty acid salts, such as ricinoleic acid, palmitic acid, barium stearate, calcium stearate and zinc laurate; and synthetic polymer materials, such as petroleum resins, atactic polypropylene and coumarone-indene resins. Of these, petroleum type softening agents are preferably used, and process oil is particularly preferably used. The softening agent can be used in an amount of usually not more than 150 parts by weight, preferably not more than 100 parts by weight, based on 100 parts by weight of the total amount of the unsaturated olefin copolymer (A) and the diene rubber (B).

Examples of the vulcanization accelerators include:

sulfenamide compounds, such as N-cyclohexyl-2-benzothiazole sulfenamide (CBS), N-oxydiethylene-2-benzothiazole sulfenamide (OBS), N,N-diisopropyl-2-benzothiazole sulfenamide;

thiazole compounds, such as 2-mercaptobenzothiazole (MBT), 2-(2,4-dinitrophenyl)mercaptobenzothiazole, 2-(2,6-diethyl-4-morpholinothio)benzothiazole and dibenzothiazyl disulfide;

guanidine compounds, such as diphenylguanidine, triphenylguanidine, diorthonitrileguanidine, orthonitrile biguanide and diphenylguanidine phthalate;

aldehyde amine compounds or aldehyde ammonia compounds, such as acetaldehyde-aniline condensate, butylaldehyde-aniline condensate, hexamethylenetetramine and acetaldehyde ammonia;

imidazoline compounds, such as 2-mercaptoimidazoline;

thiourea compounds, such as thiocarbanilide, diethylthiourea, dubutylthiourea, trimethylthiourea and diorthotolylthiourea;

thiuram compounds, such as tetramethylthiuram monosulfide (TMTM), tetramethylthiuram disulfide (TMTD), tetraethylthiuram disulfide, tetrabutylthiuram disulfide and dipentamethylenethiuram tetrasulfide (DPTT);

dithio acid salt compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

xanthate compounds, such as zinc dibutylxanthate; and other compounds, such as zinc white.

The vulcanization accelerator can be used in an amount of 0.1 to 20 parts by weight, preferably 0.2 to 10 parts by weight, based on 100 parts by weight of the total amount of the unsaturated olefin copolymer (A) and the diene rubber (B).

For preparing a vulcanized rubber (tire side wall) from the rubber composition for tire side wall according to the invention, the rubber composition obtained as above is molded into a desired shape and then vulcanized.

There is no specific limitation on the process for preparing the vulcanized rubber. For example, the following method is employable.

In a mixer such as a Banbury mixer, the unsaturated olefin copolymer (A), the diene rubber (B), the carbon black (C), and if necessary, other rubber compounding ingredients are kneaded at a temperature of 80 to 170° C. for a period of 3 to 10 minutes. Then, using rolls such as open rolls, the vulcanizing agent (D) and if necessary the vulcanization accelerator are added, and the mixture is kneaded at a roll temperature of 40 to 80° C. for a period of 5 to 30 minutes, followed by rolling, to prepare an unvulcanized compounded rubber in the form of a ribbon or a sheet. The unvulcanized compounded rubber is then molded into a desired shape by means of an extrusion molding machine, a calender roll or a press. Simultaneously with the molding, the compounded rubber is heated at a temperature of 150 to 200° C. for a period of 5 to 60 minutes, or after the molding, the molded rubber is introduced into a vulcanizer and heated at a temperature of 150 to 200° C. for a period of 5 to 60 minutes, to obtain a vulcanized rubber. The vulcanization may be conducted where a mold may or may not be used. In case of using no mold, the vulcanization process is generally carried out continuously. For heating the compounded rubber in the vulcanizer, various heating means, such as hot air, glass bead fluidized bed, UHF (ultra high frequency electromagnetic wave) and steam (heating bath), can be employed.

The vulcanized rubber thus obtained is excellent in vibration-damping properties, vibration-isolating properties and strength properties as well as in heat resistance, weathering resistance and dynamic fatigue resistance.

Rubber Composition for Tire Tread

The rubber composition for tire tread according to the invention comprises the unsaturated olefin copolymer (A') and the diene rubber (B). The unsaturated olefin copolymer (A') may be graft-modified with a polar monomer. The unsaturated ethylene copolymer which is graft-modified (hereinafter referred to as "graft-modified unsaturated ethylene copolymer (A')") can be obtained by the reaction of the unsaturated ethylene copolymer (A') with the polar monomer in the presence or absence of a radical initiator.

As the polar monomers, hydroxy group-containing ethylenically unsaturated compounds, amino group-containing ethylenically unsaturated compounds, epoxy group-containing ethylenically unsaturated compounds, unsaturated carboxylic acids or derivatives thereof, vinyl esters and vinyl chloride can be mentioned.

Examples of the hydroxy group-containing ethylenically unsaturated compounds include (meth)acrylic acid esters, such as hydroxyethyl (meth)acrylate, 2-hydroxypropyl (meth)acrylate, 3-hydroxypropyl (meth)acrylate, 2-hydroxy-3-phenoxy-propyl (meth)acrylate, 3-chloro-2-hydroxypropyl (meth)acrylate, glycerol mono(meth)

acrylate, pentaerythritol mono(meth)acrylate, trimethylolpropane mono(meth)acrylate, tetramethylolthane mono(meth) acrylate, butanediol mono(meth)acrylate, polyethylene glycol mono(meth)crylate and 2-(6-hydroxyhexanoiloxy)ethyl acrylate; and further 10-undecene-1-ol, 1-octene-3-ol, 2-methanol norbornene, hydroxybutyl vinyl ether, N-methylolacrylamide, 2-(meth)acryloiloxyethyl acid phosphate, glycerol monoacryl ether, allyl alcohol, allyloxyethanol, 2-butene-1,4-diol and glycerol mono-alcohol.

The amino group-containing ethylenicaly unsaturated compounds are compounds which contain an ethylenically unsaturated group and an amino group, and include vinyl monomers containing at least one amino or substituted amino group of the formula

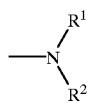

wherein $R^1$ is hydrogen atom, methyl group or ethyl group, and $R^2$ is hydrogen atom, an alkyl group having 1 to 12, preferably 1 to 8 carbon atoms, or a cycloalkyl group having 6 to 12, preferably 6 to 8 carbon atoms. The alkyl group and the cycloalkyl group may have a substituent.

Examples of the amino group-containing ethylenically unsaturated compounds include, specifically, vinyl amine derivatives such as aminoethyl (meth)acrylate, propylaminoethyl (meth)acrylate, dimethylaminoethyl methacrylate, aminopropropyl (meth)acrylate, phenylaminoethyl methacrylate and cyclohexylaminoethyl methacrylate; acrylamide derivatives such as acrylamide and N-methyl acrylamide; aminostyrenes such as p-aminostyrene; and 6-aminohexylsuccinimide and 2-aminoethylsuccinimide.

The epoxy group-containing ethylenically unsaturated compounds are monomers which contain at least one epoxy group per molecule. Examples of the epoxy group-containing ethylenically unsaturated compounds include glycidyl acrylate and glycidyl methacrylate; mono- and dialkylglycidyl esters of dicarboxylic acids wherein an alkyl group in the alkylglycidyl ester moiety may have 1 to 12 carbon atoms, such as mono- and diglycidyl ester of maleic acid, mono- and diglycidyl ester of fumaric acid, mono- and diglycidyl ester of crotonic acid, mono- and diglycidyl ester of tetrahydrophthalic acid, mono- and diglycidyl ester of itaconic acid, mono- and diglycidyl ester of butenetricarboxylic acid, mono- and diglycidyl ester of citraconic acid, mono- and diglycidyl ester of endo-cis-bicyclo[2.2.1]hept-5-ene-2,3-dicarboxylic acid (Nadic Acid™), mono- and diglycidyl ester of allylsuccinic acid; and further alkylglycidyl esters of p-stylene-carboxylic acid, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monooxide.

Examples of the unsaturated carboxylic acids include unsaturated carboxylic acids such as acrylic acid, methacrylic acid, maleic acid, fumaric acid, tetrhydrophthalic acid, itaconic acid, citraconic acid, crotonic acid, isocrotonic acid, norbornene dicarboxylic acid and bicyclo[2.2.1]hept-2-ene-5,6-dicarboxylic acid; and anhydrides thereof and derivatives thereof, such as acid halides, amides, imides and esters, more specifically, maleyl chloride, maleyl imide, maleic anhydride, itaconic anhydride, citraconic anhydride, tetrahydrophthalic anhydride, bicyclo[2.2.1]hept-2-ene-5,6-dicarboxylic anhydride, dimethyl maleate, monomethyl maleate, diethyl maleate, dimethyl fumarate, dimethyl itaconate, diethyl citraconate, dimethyl bicyclo[2.2.1]hept-2-ene-5,6-dicarboxylate, hydroxyethyl (meth)acrylate, hydroxypropyl (meth)acrylate, grycidyl (meth)acrylate, aminoethyl methacrylate and aminopropyl methacryalte. Of these, preferred are (meth)acrylic acid, maleic anhydride, hydroxyethyl (meth)acrylate, glycidyl methacrylate and aminopropyl methacrylate.

Examples of the vinyl ester compounds include vinyl acetate, vinyl propionate, vinyl butyrate, vinyl isobutyrate, vinyl pivalate, vinyl caprate, vinyl versatate, vinyl laurate, vinyl stearate, vinyl phthalate, vinyl t-butylphthalate, vinyl salicylate and vinyl cyclohexanoate.

The polar monomer for the graft-modification can be used in an amount of usually 0.1 to 100, preferably 0.5 to 80 parts by weight, based on 100 parts by weight of the unsaturated olefin copolymer (A').

The radical initiators for use in the graft-modification are, for example, an organic peroxide and an azo compound.

Specific examples of the organic peroxides include dicumyl peroxide, di-t-butyl peroxide, 2,5-dimethyl-2,5-bis(t-butylperoxy)hexyne-3, 1,3-bis(t-butylperoxyisopropyl)benzene, 1,1-bis(t-butylperoxy)valerate, benzoyl peroxide, t-butylperoxybenzoate, acetyl perosede, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide. Examples of the azo compounds include azoisobutyronitrile and dimethylazoisobutyronitlyle.

The radical initiator is desirably used in an amount of 0.001 to 10 parts by weight, based on 100 parts by weight of the unsaturated olefin copolymer (A').

The radical initiator may be used by mixing with the unsaturated olefin copolymer (A') and the polar monomer, or by dissolving in a small amount of an organic solvent. Any organic solvent which can dissolve the radical initiator can be used without specific limitation. Examples of the organic solvent include aromatic hydrocarbons, such as benzene, toluene and xylene; aliphatic hydrocarbons, such as pentane, hexane, heptane, octane, nonane and decane, alicyclic hydrocarbons, such as cyclohexane and decahydronaphthalene; chlorinated hydrocarbons, such as chlorobenzene, dichlorobenzene, trichlorobenzene, methylene chloride, chloroform, carbon tetrachloride and tetrachloroethylene; alcohol solvents, such as methanol, ethanol, n-propanol, iso-propanol, n-butanol, sec-butanol and tert-butanol; ketone solvents such as acetone, methyl ethyl ketone, and methyl isobutyl ketone; ester solvents, such as ethyl acetate and dimethyl phthalate; ether solvents, such as dimethyl ether, diethyl ether, di-n-amyl ether, tetrahydrofuran and dioxyanisole.

In the graft modification of the unsaturated olefin copolymer (A'), there can be used a reducing material, which may serve to increase the graft amount in the resulting graft-modified copolymer (A').

The reducing material includes not only iron(II) ion, chromium ion, cobalt ion, nickel ion, palladium ion, sulfite, hydroxylamine and hydrazine but also compounds containing groups such as —SH, $SO_3H$, —$NHNH_2$ and —COCH(OH)—.

Examples of such reducing materials include ferrous chloride, potassium bichromate, cobalt chloride, cobalt naphthenate, palladium chloride, ethanolamine, diethanolamine, N,N-dimethylaniline, hydrazine, ethylmercaptan, benzenesulfonic acid and p-toluenesulfonic acid.

The reducing material can be used in an amount of usually 0.001 to 5 parts by weight, preferably 0.1 to 3 parts by weight, based on 100 parts by weight of the unsaturated olefin copolymer (A').

The graft modification of the unsaturated olefin copolymer (A') can be carried out in a conventional manner. For example, the unsaturated copolymer (A') is dissolved in an organic solvent, and to the solution is then added the polar monomer and the radical initiator to react them at 70 to 200° C., preferably 80 to 190° C., for 0.5 to 15 hours, preferably 1 to 10 hours.

There is no specific limitation on the organic solvent used for graft modifying the unsaturated olefin copolymer (A'), and any organic solvents can be used as far as they dissolve the unsaturated copolymer (A').

Examples of such organic solvents include aromatic hydrocarbon solvents such as benzene, toluene and xylene; and aliphatic hydrocarbon solvents such as pentane, hexane and heptane.

The unsaturated copolymer of ethylene can be reacted with the polar monomer in the absence of any solvent using an extruder or the like to prepare a graft modified unsaturated copolymer of ethylene. In this case, the reaction temperature is usually not lower than the melting point of the unsaturated olefin copolymer (A'), specifically, in the range of 120 to 250° C. The reaction time under such temperature condition is usually in the range of 0.5 to 10 minutes.

In the graft modified unsaturated olefin copolymer (A') thus prepared, the graft amount of the graft group derived from the polar monomer is in the range of usually 0.1 to 50% by weight, preferably 0.2 to 30% by weight.

In the rubber composition for tire tread of the present invention, the weight ratio of the unsaturated olefin copolymer (A') to the diene rubber (B) is in the range of 1/99 to 50/50, preferably 5/95 to 30/70.

The rubber composition for tire tread of the present invention is a vulcanizable rubber composition and is usually used after vulcanized though it can also be used as an unvulcanized composition. The vulcanization can be carried out using a vulcanizing agent by heating or without using a vulcanizing agent by irradiating electron rays.

When the rubber composition for tire tread of the present invention is vulcanized by heating, a compound which forms a vulcanization system such as a vulcanizing agent, vulcanization accelerator, vulcanization aid or the like can be added to the rubber composition.

As the vulcanizing agents, the above described vulcanizing agents (D) can be used singly or in combination.

Of the above-described various vulcanizing agents, sulfur or a sulfur compound, in particular sulfur, is preferably used because the rubber composition having excellent properties can be obtained.

When the vulcanizing agent is sulfur or a sulfur compound, it can be used in an amount of 0.05 to 15, preferably 0.15 to 5 parts by weight, based on 100 parts by weight of the unsaturated olefin copolymer (A').

When the sulfur or sulfur compound is used as the vulcanization agent, it is preferable to use a vulcanization accelerator in combination.

As the vulcanization accelerators, the same accelerators described for the composition for tire side wall can be used.

It is preferable that the vulcanization accelerator is used in an amount of 0.1 to 20, preferably 0.2 to 10 parts by weight, based on the unsaturated olefin copolymer (A').

When the organic peroxide is used as the vulcanizing agent, it is preferable to use a vulcanization aid in an amount of 0.5 to 2 mol, more preferably about 1 mol, per mol of the organic peroxide.

Examples of the vulcanization aid include sulfur; quinone dioxime compounds, such as p-quinone dioxime; and further polyfunctional monomers, e.g., (meth)acrylate compounds such as trimethylolpropane trimethacrylate and polyethylene glycol dimethacrylate; allyl compounds, such as diallyl phthalate and triallyl cyanurate; maleimide compounds, such as m-phenylene maleimide; and divinyl benzene.

The rubber composition for tire tread according to the present invention can further comprise conventional rubber compounding ingredients, for example, rubber reinforcing agents such as carbon black and finely-divided silicic acid; softening agents; fillers such as calcium carbonate light, calcium carbonate heavy, talc, clay and silica; tackifiers; waxes; binder resins; zinc white; antioxidants; ozone crack inhibitors; and processing aids. These compounding ingredients may be used singly or in combination.

The reinforcing agent can be added in an amount of 20 to 150, preferably 30 to 100 parts by weight, based on 100 parts by weight of the total of the unsaturated olefin copolymer (A') and the diene rubber (B). In general, when the reinforcing agent is added in a greater amount, the braking ability on wet road (wet skid) is enhanced, while rolling resistance tends to be lowered. On then other hand, when the reinforcing agent is added in a smaller amount, abrasion resistance tends to be lowered.

The rubber composition for tire tread according to the present invention can be prepared by a conventional method for compounded rubbers. For example, the unsaturated olefin copolymer (A'), the diene rubber (B), and optionally, compounding ingredients are kneaded together in an internal mixer, such as a Banbury mixer, a kneader or inter mixer, at a temperature of 80 to 170° C. for 3 to 10 minutes. The kneadate obtained, if necessary, after addition of the vulcanizing agent, vulcanization accelerator or vulcanizing aid thereto, is further kneaded using rolls such as open rolls or a kneader, at a roll temperature of 40 to 80° C. for 5 to 30 minutes, followed by rolling, to obtain a compounded rubber. When the kneading in the internal mixer is carried out at a low temperature, for example lower than 60° C., the vulcanizing agent, vulcanization accelerator, foaming agent and the like can also be kneaded at the same time.

The vulcanized product (vulcanized rubber) of the composition for tire tread according to the present invention can be obtained by various molding methods, where the above unvulcanized rubber composition is premolded into a desired shape using, for example, a molding machine such as a calendar roll, a press, an injection molding machine or a transfer molding machine, and then or at the same time of the molding, the vulcanization is carried out by heating in a vulcanizer or by irradiation of electron rays.

In order to effect the vulcanization, various heating means, such as hot air, glass beads fluidized bed, UHF (ultra high frequency electromagnetic wave), steam or LCM (liquid molten salt bath), can be employed. It is preferable that the heating is carried out at a temperature of 150 to 270° C. for 1 to 30 minutes.

Further, when the vulcanization is performed by irradiation of electron rays without the use of any vulcanizing agent, the premolded rubber composition obtained as above can be irradiated with electron rays having an energy of 0.1 to 10 MeV, preferably 0.3 to 2 MeV, so that the dose becomes 0.5 to 35 Mrad, preferably 0.5 to 10 Mrad.

In the vulcanization, a mold may or may not be used. In case where the mold is not used, the vulcanization is usually carried out continuously, The vulcanized rubber obtained as described above has excellent strength properties, abrasion resistance and braking ability on wet road as well as small rolling resistance so that it is suitable for use as a tire tread rubber.

Effect of the Invention

The rubber composition for tire side wall according to the invention has excellent strength properties and flex fatigue resistance. From the rubber composition, a tire side wall of low fuel consumption can be obtained.

The rubber composition for tire tread according to the invention can provide a tire tread having excellent strength properties, abrasion resistance and braking ability on wet road (wet skid) as well as small rolling resistance.

EXAMPLES

The present invention is further described with reference to the following examples, but it should be construed that the invention is in no way limited to those examples.

Test Method

Tensile Test

Tensile strength (TB) and elongation (EB) were measured in accordance with JIS K 6301.

Hardness Test

JIS A hardness (HS) was measured in accordance with JIS K 6301.

Extension Fatigue Test (Monsanto fatigue test)

The vulcanized rubber sheet was punched to prepare a dumbbell specimen of No. 1 described in JIS K 6301, and a longitudinal notch of 2 mm was given to the center of the specimen. Out of 60 specimens obtained as above, 20 specimens were extended until they had an extensibility of 40%, and they were fatigued under the conditions of a preset temperature of 40° C. and a revolution speed of 300 rpm, to obtain a mean value of the number of revolutions at which the dumbbell specimen was broken. Further, an extension fatigue test was carried out in the same manner as above, except that the extensibility was varied to 80% or 150%.

Monsanto Fatigue Tester

Frequency: 5 Hz

Temperature: 27° C.

Dynamic Viscoelasticity Test

A vulcanized rubber sheet having a thickness of 2 mm was subjected to dynamic viscoelasticity test using a viscoelasticity tester (RDS-2 model) available from Rheometric Co. under the conditions of a measuring temperature of 25° C., a frequency of 10 Hz and a strain of 1%, to obtain dynamic modulus (kg/cm$^2$) and loss dynamic modulus (kg/cm$^2$). Using these values, dissipation factor (tan$\delta$) was calculated from the following equations.

$$G_s = G' + \iota G''$$

($G_s$: static modulus, real part G': dynamic modulus, imaginary part G'': loss of dynamic modulus)

$$\tan \delta = G''/G'$$

The dissipation factor (tan $\delta$) is an indication of fuel consumption properties, and the smaller the dissipation factor value, the lower the fuel consumption. It is theoretically known that when strain is applied to a rubber material, the heat value is directly proportional to the square of the applied strain and is proportional to the frequency and tan $\delta$. The more the force transferred to a tire is consumed as heat, not but rolling force, the worse is fuel consumption. Therefore, a tire side wall material having a small value as tan $\delta$ which relates to generation of heat can be considered as a material of low fuel consumption.

Rambong Abrasion

Measured using a rambong abrasion tester available from Iwasaki Seisakusyo K.K. under the following conditions:

Measuring conditions:
  Load: 3 kg
  Peripheral speed of sample: 150 m/min
  Peripheral speed of wheel: 100 m/min Tan $\delta$ The tan $\delta$ value of the rubber composition for tire tread was measured using a dynamic spectrometer available from Rheometrics Co. under the following conditions:

Measuring conditions:
  Share strain: 0.5%
  Frequency: 15 Hz

Synthesis 1

A 1.5-liter autoclave was thoroughly purged with nitrogen, and the autoclave was charged with 430 ml of hexane, 50 ml of styrene and 8 ml of 4-ethylidene-8-methyl-1,7-nonadiene (EMND). Further, propylene was introduced so that the pressure in the system became 2.5 kg/cm$^2$. Then, the system was heated to 40° C. with stirring, and ethylene was fed so that the pressure in the system became 8 kg/cm$^2$. Into a different reactor, 9.2 mmol of methylaluminoxane (available from Tosoh Aquzo K.K., 3 wt % toluene solution) and 0.018 mmol of (dimethyl(tert-butylamide)(tetramethyl-$\eta^5$-cyclopentadienyl)silane)dichloride titanium synthesized by a conventional process were introduced. After the resulting solution was stirred for 15 minutes in the reactor, the solution was transferred into the autoclave to initiate polymerization. To the autoclave, ethylene was continuously fed so that the pressure in the system was maintained at 8 kg/cm$^2$ during the polymerization, and the polymerization was performed for 30 minutes. Thereafter, 5 ml of methanol was added to terminate the polymerization. After the polymerization was completed, a polymer was precipitated from the reaction solution with 1 liter of methanol. The precipitated polymer was washed twice with 1 liter of methanol and then vacuum dried at 130° C. for 12 hours. As a result, 14 g of an ethylene/propylene/styrene/EMND copolymer (copolymer (a)) was obtained. In the copolymer (a), the molar ratio of constituent units derived from ethylene to constituent units derived from propylene was 73/27 (ethylene/propylene), and the molar ratio of the total of constituent units derived from ethylene and constituent units derived from propylene to constituent units derived from styrene was 94/6-(ethylene+propylene/styrene). The copolymer (a) had an iodine value of 22 and an intrinsic viscosity [$\eta$], as measured in decalin at 135° C., of 2.2 dl/g.

Synthesis 2

A 1.5-liter autoclave was thoroughly purged with nitrogen, and the autoclave was charged with 430 ml of toluene, 40 ml of styrene and 4.5 ml of EMND. Further, propylene was introduced so that the pressure in the system became 3.0 kg/cm$^2$. Then, the system was heated to 40° C. with stirring, and ethylene was fed so that the pressure in the system became 10 kg/cm$^2$.

Thereafter, polymerization reaction was carried out in the same manner as in Synthesis 1, except that ethylene was continuously fed so that the pressure in the system was maintained at 10 kg/cm$^2$. As a result, 18 g of an ethylene/propylene/styrene/EMND copolymer (copolymer (b)) was obtained. In the copolymer (b), the molar ratio of constituent units derived from ethylene to constituent units derived from propylene was 78/22 (ethylene/propylene), and the molar ratio of the total of constituent units derived from ethylene and constituent units derived from propylene to constituent units derived from styrene was 95/5 (ethylene+propylene/styrene). The copolymer (b) had an iodine value of 25 and an intrinsic viscosity [$\eta$], as measured in decalin at 135° C., of 3.3 dl/g.

Synthesis 3

A 1.5-liter autoclave was thoroughly purged with nitrogen, and the autoclave was charged with 460 ml of toluene, 35 ml of styrene and 8 ml of EMND. Further, 1-butene was introduced so that the pressure in the system became 1.7 kg/cm$^2$. Then, the system was heated to 40° C. with stirring, and ethylene was fed so that the pressure in the system became 10 kg/cm$^2$.

Thereafter, polymerization reaction was carried out in the same manner as in Synthesis 1, except that ethylene was continuously fed so that the pressure in the system was maintained at 10 kg/cm$^2$. As a result, 15 g of an ethylene/1-butene/styrene/EMND copolymer (copolymer (c)) was obtained. In the copolymer (c), the molar ratio of constituent units derived from ethylene to constituent units derived from 1-butene was 82/18 (ethylene/1-butene), and the molar ratio of the total of constituent units derived from ethylene and constituent units derived from 1-butene to constituent units derived from styrene was 95/5 (ethylene+1-butene/styrene). The copolymer (c) had an iodine value of 27 and an intrinsic viscosity [η], as measured in decalin at 135° C., of 3.0 dl/g.

Synthesis 4

A 1.5-liter autoclave was thoroughly purged with nitrogen, and the autoclave was charged with 430 ml of toluene, 30 ml of styrene, 8 ml of EMND and 40 ml of 1-octene. Then, the system was heated to 50° C. with stirring, and ethylene was fed so that the pressure in the system became 10 kg/cm$^2$.

Thereafter, polymerization reaction was carried out in the same manner as in Synthesis 1, except that ethylene was continuously fed so that the pressure in the system was maintained at 10 kg/cm$^2$. As a result, 19 g of an ethylene/1-octene/styrene/EMND copolymer (copolymer (d)) was obtained. In the copolymer (d), the molar ratio of constituent units derived from ethylene to constituent units derived from 1-octene was 85/15 (ethylene/1-octene), and the molar ratio of the total of constituent units derived from ethylene and constituent units derived from 1-octene to constituent units derived from styrene was 96/4 (ethylene+1-octene/styrene). The copolymer (d) had an iodine value of 24 and an intrinsic viscosity [η], as measured in decalin at 135° C., of 3.4 dl/g.

Synthesis 5

An ethylene/propylene/styrene/EMND copolymer (copolymer (f)) was obtained in the same manner as in Synthesis 1, except that (dimethyl(tert-butylamide)(tetramethyl-η$^5$-cyclopentadienyl)silane)dichloride titanium was replaced with isopropylidene-bis(indenyl)zirconium dichloride synthesized by a conventional process. In the copolymer (f), the molar ratio of constituent units derived from ethylene to constituent units derived from propylene was 75/25 (ethylene/propylene), and the molar ratio of the total of constituent units derived from ethylene and constituent units derived from propylene to constituent units derived from styrene was 92/8 (ethylene+propylene/styrene). The copolymer (f) had an iodine value of 19 and an intrinsic viscosity [η], as measured in decalin at 135° C., of 1.7 dl/g.

Example 1

Preparation of Vulcanized Rubber

In a 1.7-liter Banbury mixer, the copolymer (a) prepared in Synthesis 1, natural rubber (No. RSS1, produced in Malaysia), zinc white, stearic acid, N-339 carbon black (Asahi #75™, available from Asahi Carbon K.K.), naphthenic oil (Sansen 4240™, available from Nippon San Sekiyu K.K.) and an anti-aging agent (N-isopropyl-N'-phenyl-p-phenylenediamine, trade name: Nocrac 810-NA™, available from Ouchi Shinko Kagaku Kogyo K.K.) were kneaded. To the kneadate, a vulcanization accelerator TMTM, a vulcanization accelerator OBS and sulfur were added, and the mixture was kneaded by 8-inch rolls (front roll/back roll: 65/65° C., 16/18 rpm) to obtain an unvulcanized compounded rubber. The natural rubber was masticated, prior to use, in accordance with a conventional method using open rolls having been adjusted to 40° C. and thereby had a Mooney viscosity [ML$_{1+4}$(100° C.)] of 60.

Copolymer (a): 30 parts by weight

Natural rubber: 70 parts by weight zinc white: 5 parts by weight

Stearic acid: 1 part by weight

N-339 Carbon black: 75 parts by weight

Naphthenic oil: 60 parts by weight

Anti-aging agent: 1 part by weight

Vulcanization accelerator TMTM: 0.5 part by weight

Vulcanization accelerator OBS: 1.2 parts by weight

Sulfur: 2.0 parts by weight

The unvulcanized compounded rubber obtained above was heated for 10 minutes by means of a press having been heated to 160° C., to prepare a vulcanized rubber sheet having a thickness of 2 mm. Then, the vulcanized rubber sheet was subjected to the above-described tests. The results are set forth in Table 1.

Example 2

The procedure of Example 1 was repeated, except that a copolymer (b) prepared in Synthesis 2 was used in place of the copolymer (a). The results are set forth in Table 1.

Example 3

The procedure of Example 1 was repeated, except that a copolymer (c) prepared in Synthesis 3 was used in place of the copolymer (a). The results are set forth in Table 1.

Example 4

The procedure of Example 1 was repeated, except that a copolymer (d) prepared in Synthesis 4 was used in place of the copolymer (a). The results are set forth in Table 1.

Example 5

The procedure of Example 1 was repeated, except that a copolymer (f) prepared in Synthesis 5 was used in place of the copolymer (a). The results are set forth in Table 1.

Comparative Example 1

The procedure of Example 1 was repeated, except that the copolymer (a) was not used and 100 parts by weight of an ethylene/propylene/EMND copolymer (copolymer (e), ethylene/propylene (by mol)=68/32, iodine value: 22, intrinsic viscosity [η] measured in decalin at 135° C.: 2.2 dl/g) was used. The results are set forth in Table 1.

TABLE 1

| | Example | | | | | Comp. Ex. |
|---|---|---|---|---|---|---|
| | 1 | 2 | 3 | 4 | 5 | 1 |
| Unsaturated olefin copolymer | | | | | | |
| Copolymer (a) | 30 | — | — | — | — | — |
| Copolymer (b) | — | 30 | — | — | — | — |
| Copolymer (c) | — | — | 30 | — | — | — |
| Copolymer (d) | — | — | — | 30 | — | — |
| Copolymer (e) | — | — | — | — | — | 100 |
| Copolymer (f) | — | — | — | — | 30 | — |
| Diene rubber NR | 70 | 70 | 70 | 70 | 70 | — |
| Carbon black | 75 | 75 | 75 | 75 | 75 | 75 |
| Vulcanization agent (sulfur) | 2.0 | 2.0 | 2.0 | 2.0 | 2.0 | 2.0 |
| Physical properties | | | | | | |
| $T_B$ (MPa) | 16 | 19 | 20 | 20 | 14 | 12 |
| $E_B$ (%) | 500 | 600 | 640 | 580 | 480 | 500 |
| $H_S$ (JIS A) | 56 | 58 | 57 | 56 | 54 | 55 |
| Extension | | | | | | |
| 40% (times) | >$10^5$ | >$10^5$ | >$10^5$ | >$10^5$ | >$10^5$ | 45000 |
| 80% (times) | 35000 | 42000 | 66000 | 51000 | 34000 | 9400 |
| 150% (times) | 12000 | 18000 | 35000 | 28000 | 11000 | 4100 |
| tan δ (25° C.) | 0.08 | 0.07 | 0.05 | 0.06 | 0.10 | 0.15 |

Synthesis 6
Preparation of Unsaturated Olefin Copolymer (A')

A 1-liter reaction vessel equipped with a condenser and a stirrer was thoroughly purged with nitrogen, and the reaction vessel was charged with 495 ml of toluene, 5 ml of styrene and 5 ml of 8-methyl-4-ethylidene-1,7-nonadiene (EMN) and then saturated with ethylene with stirring. Then, the system was heated to 35° C., and 9 mM of methylaluminoxane (manufactured by Toso Aquzo K.K., 10 wt % toluene solution) and 0.03 mmol (0.01 mM toluene solution) of (dimethyl(t-butylamide)(tetramethyl-η5-cyclopentadienyl)silane)titanium dichloride were added. The polymerization was performed at 40° C. for 60 minutes while continuously feeding ethylene at a rate of 100 N liter/hour. After the polymerization was completed, 250 ml of isobutyl alcohol and 10 ml of aqueous hydrochloric acid were added, followed by heating with stirring at 80° C. for 30 minutes. The reaction solution containing isobutyl alcohol was transferred to a dropping funnel and washed twice with 250 ml of water, and then oil-water separation was performed. Then, the oil layer was added to 3 liters of methanol to precipitate a polymer. The precipitated polymer was vacuum dried at 130° C. for 12 hours. The yield was 7.4 g.

The molar ratio (ethylene/styrene) of ethylene to styrene, constituting the resulting unsaturated olefin copolymer (copolymer rubber (g)), was 98/2 and the iodine value was 18. The intrinsic viscosity [η] measured in decalin at 135° C. was 4.5 dl/g. The results are summarized in Table 2.

Synthesis 7 to Synthesis 10

The procedure of Synthesis 6 was repeated, except that the charge amount of monomers was changed to the amount shown in Table 2, to obtain unsaturated olefin copolymers (copolymer rubbers (h) to (k)), respectively. The results are shown in Table 2.

Synthesis 11

An unsaturated olefin copolymer (copolymer rubber (l)) was obtained in the same manner as in Synthesis 10, except the catalyst was replaced with isopropylidene-bis(indenyl) zirconium dichloride synthesized by a conventional process. The results are shown in Table 2.

TABLE 2

| Copolymer rubber | (g) | (h) | (i) | (j) | (k) | (l) |
|---|---|---|---|---|---|---|
| Polymerization conditions | | | | | | |
| Charged toluene (ml) | 495 | 480 | 470 | 400 | 450 | 495 |
| Charged styrene (ml) | 5 | 20 | 30 | 100 | 50 | 5 |
| Charged polyene (ml) | 5 | 8 | 5 | 3 | — | 5 |
| Reaction temperature (° C.) | 40 | 30 | 30 | 30 | 40 | 40 |
| Reaction time (min.) | 60 | 75 | 75 | 75 | 60 | 60 |
| Yield (g) | 7.4 | 5.2 | 5.0 | 9.5 | 15 | — |
| Physical properties of rubber | | | | | | |
| Ethylene/styrene (mol) | 98/2 | 91/9 | 88/12 | 60/40 | 77/23 | 98/2 |
| Kind of polyene | EMN | EMN | ENB | ENB | — | EMN |
| Iodine value (g/100 g rubber) | 18 | 33 | 22 | 8 | 0 | 17 |
| Intrinsic viscosity (dl/g) | 4.5 | 2.5 | 1.8 | 1.3 | 1.3 | 4.0 |

ENB: 5-ethylidenenorbornene
EMN: 8-methyl-4-ethylidene-1,7-nonadiene

Examples 6 to 11 and Comparative Examples 2 to 6

Copolymer rubbers (g) to (l) of Synthesis 6 to Synthesis 11 were each mixed in accordance with Table 3 or Table 4. The resulting mixture was kneaded by 8-inch open rolls and then vulcanized at 150° C. for 20 minutes to obtain a vulcanized rubber. Then, the physical properties of each vulcanized rubber were measured.

The rubber properties were evaluated by the above-described test methods. Namely, the strength characteristics were evaluated by the tensile strength ($T_B$), the abrasion resistance was evaluated by the rambong method, the braking performance on wet road (wet skid) was evaluated by tan δ at 0° C. using a spectrometer and the rolling resistance was evaluated by tan δ at 50° C. using a spectrometer, respectively.

TABLE 3

| | Example No. | | | Comparative Example No. | |
|---|---|---|---|---|---|
| | 6 | 7 | 8 | 2 | 3 |
| Copolymer rubber (A') *1 | | | | | |
| (g) | 30 | — | — | — | — |
| (h) | — | 30 | — | — | — |
| (i) | — | — | 30 | — | — |
| (j) | — | — | — | 30 | — |
| (k) | — | — | — | — | 30 |
| EPDM *2 | — | — | — | — | — |
| Diene rubber (B) | | | | | |
| NR *3 | 70 | 70 | 70 | 70 | 70 |
| SBR *4 | — | — | — | — | — |
| Carbon black *5 | 45 | 45 | 45 | 45 | 45 |
| Zinc white | 2 | 2 | 2 | 2 | 2 |
| Sulfur | 1.5 | 1.5 | 1.5 | 1.5 | 1.5 |
| Vulcanization accelerator *6 | 1.2 | 1.2 | 1.2 | 1.2 | 1.2 |
| Physical properties | | | | | |
| $T_S$ (MPa) | 237 | 228 | 192 | 188 | 175 |
| Rambong abrasion | 0.049 | 0.050 | 0.057 | 0.063 | 0.088 |

TABLE 3-continued

| | Example No. | | | Comparative Example No. | |
|---|---|---|---|---|---|
| | 6 | 7 | 8 | 2 | 3 |
| tan δ (0° C.) *7 | 0.28 | 0.30 | 0.31 | 0.48 | 0.41 |
| tan δ (50° C.) *8 | 0.055 | 0.061 | 0.066 | 0.15 | 0.13 |

TABLE 4

| | Example No. | | | Comparative Example No. | | |
|---|---|---|---|---|---|---|
| | 9 | 10 | 11 | 4 | 5 | 6 |
| Copolymer rubber (A') *1 | | | | | | |
| (g) | 20 | — | — | — | — | — |
| (h) | — | 20 | — | — | — | — |
| (i) | — | — | — | — | 60 | — |
| (j) | — | — | — | — | — | — |
| (k) | — | — | — | — | — | — |
| (l) | — | — | 30 | — | — | — |
| EPDM *2 | — | — | — | — | — | 30 |
| Diene rubber (B) | | | | | | |
| NR *3 | 50 | 50 | 70 | 100 | 40 | 70 |
| SBR *4 | 30 | 30 | — | — | — | — |
| Carbon black *5 | 45 | 45 | 45 | 45 | 45 | 45 |
| Zinc white | 2 | 2 | 2 | 2 | 2 | 2 |
| Sulfur | 1.5 | 1.5 | 1.5 | 1.5 | 1.5 | 1.5 |
| Vulcanization accelerator *6 | 1.2 | 1.2 | 1.2 | 1.2 | 1.2 | 1.2 |
| Physical properties | | | | | | |
| $T_S$ (MPa) | 252 | 246 | 235 | 220 | 181 | 181 |
| Rambong abrasion | 0.046 | 0.047 | 0.050 | 0.051 | 0.075 | 0.085 |
| tan δ (0° C.) *7 | 0.32 | 0.34 | 0.29 | 0.14 | 0.53 | 0.14 |
| tan δ (50° C.) *8 | 0.045 | 0.047 | 0.056 | 0.045 | 0.095 | 0.060 |

Note of Table 3 and Table 4
*1: see Synthesis 6 to Synthesis 11
*2: Ethylene/propylene/diene copolymer rubber
*3: Natural rubber, RSS#3
*4: Styrene/butadiene copolymer rubber, Nippol 1502 (trade mark) manufactured by Nippon Gosei Gomu Co., Ltd.
*5: N339 (trade mark) manufactured by Asahi Carbon Co., Ltd.
*6: N-t-butyl-2-benzothiazyl sulfenamide
*7: The larger the value of tan δ (0° C.), the better the braking properties.
*8: The smaller the value of tan δ (50° C.), the smaller the rolling resistance and the smaller the fuel cost.

What is claimed is:

1. A rubber composition for tire side wall, comprising:
   (A) an unsaturated olefin copolymer prepared from
      (i) ethylene,
      (ii) an aromatic vinyl compound,
      (iii) a non-conjugated polyene, and optionally
      (iv) an α-olefin having 3 or more carbon atoms, in which the molar ratio [(i)/(iv)] of constituent units derived from ethylene (i) to constituent units derived from the α-olefin having 3 or more carbon atoms (iv) is in the range of from 100/0 to 40/60, the molar ratio [((i)+(iv))/(ii)] of the sum of constituent units derived from ethylene (i) and constituent units derived from the α-olefin having 3 or more carbon atoms (iv) to constitutuent units derived from the aromatic vinyl compound (ii) is in the range of from 98/2 to 60/40, the intrinsic viscosity [η] measured in decalin at 135° C. is in the range of from 1.0 to 6.0 dl/g, and the iodine number is in the range of from 10 to 50; and
   (B) a diene rubber.

2. The rubber composition for tire side wall according to claim 1, wherein the aromatic vinyl compound (ii) is an aromatic vinyl compound represented by the following general formula:

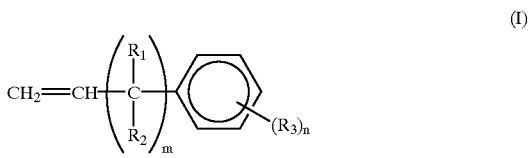

(I)

wherein $R^1$ and $R^2$ may be the same or different and are each a hydrogen atom or an alkyl group of 1 to 8 carbon atoms; $R_3$ is an alkyl group having 1 to 8 carbon atoms, alkoxy group, carboxyl group, acyloxy group, acyloxy-substituted alkyl group, hydroxyl group or halogen atom; m' is an integer of from 0 to 5; and n' is an integer of from 0 to 2.

3. The rubber composition for the tire side wall according to claim 1, further comprising carbon black (C) and/or a vulcanizing agent (D), in addition to the unsaturated olefin copolymer (A) and the diene rubber (B).

4. The rubber composition for tire side wall according to claim 1, wherein the content of the unsaturated olefin copolymer (A) is from 20 to 80 parts by weight and the content of the diene rubber (B) is from 20 to 80 parts by weight, based on 100 parts by weight of the total amount of the unsaturated olefin copolymer (A) and diene rubber (B).

5. The rubber composition for tire side wall according to claim 1, wherein the non-conjugated polyene (iii) is at least one non-conjugated triene or tetraene selected from compounds represented by the following general formula (II-a), constituent units derived from the non-conjugated polyene being represented by the following general formula (II-b), and compounds represented by the following general formula (III-a), constituent units derived from the non-conjugated polyene being represented by the following general formula (III-b):

$$H_2C=CH-CH_2-\left(\begin{matrix}R^1\\|\\C\\\|\\CH\\|\\CH_3\end{matrix}\right)_p\left(\begin{matrix}R^3\ R^4\\|\ \ |\\C=C\\|\ \ |\\R^2\end{matrix}\right)_f\left(\begin{matrix}R^3\ R^4\\|\ \ |\\C=C\\\end{matrix}\right)_q\left(\begin{matrix}R^5\\|\\C\\|\\R^6\end{matrix}\right)_g-CR^7=CR^8R^9$$

(II-a)

wherein p and q may be the same as or different from each other, and are each 0 or 1, with the proviso that each of p and q is not 0 at the same time; f is an integer of 0 to 5, with the proviso that f is not 0 when p and q are each 1; g is an integer of 1 to 6; $R^1$, $R^2$, $R^3$, $R^4$, $R^5$, $R^6$ and $R^7$ may be the same or different and are each a hydrogen atom or an alkyl group of 1 to 5 carbon atoms; $R^8$ is a hydrogen atom or an alkyl group of 1 to 5 carbon atoms; and $R^9$ is a hydrogen atom, an alkyl group of 1 to 5 carbon atoms or a group represented by $-(CH_2)_n-CR^{10}=CR^{11}R^{12}$ (n is an integer of 1 to 5, $R^{10}$ and $R^{11}$ may be the same or different and are each a hydrogen atom or an alkyl group of 1 to 5 carbon atoms, and $R^{12}$ is an alkyl group of 1 to 5 carbon atoms), with the proviso that when p and q are each 1, $R^9$ is a hydrogen atom or an alkyl group of 1 to 5 carbon atoms;

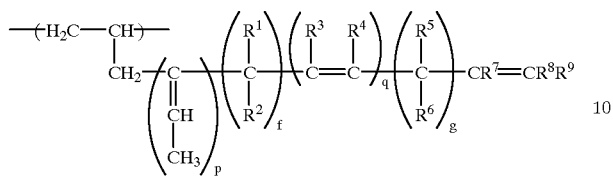
(II-b)

wherein p, q, f, g, and $R^1$ to $R^9$ have the same meanings as in the formula (II-a);

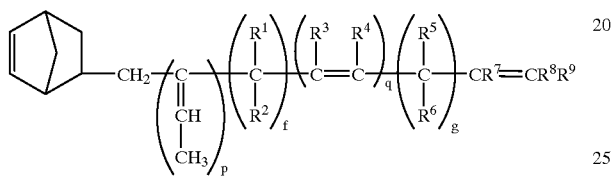
(III-a)

wherein p, q, f, g, and $R^1$ to $R^9$ have the same meanings as in the formula (II-a);

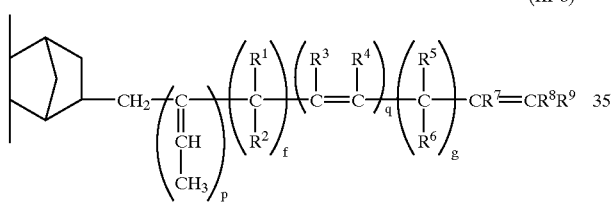
(III-b)

wherein p, q, f, g, and $R^1$ to $R^9$ have the same meanings as in the formula (II-a).

6. The rubber composition for tire side wall according to claim 5, wherein the non-conjugated triene or tetraene represented by the general formula (II-a) is a compound represented by the following general formula (IV-a), constituent units derived from the non-conjugated triene or tetraene being represented by the following general formula (IV-b), and the non-conjugated triene or tetraene represented by the above general formula (III-a) is a compound represented by the following general formula (V-a), constituent units derived from the non-conjugated triene or tetraene being represented by the following general formula (V-b):

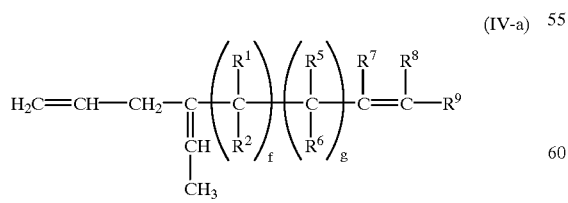
(IV-a)

wherein f is an integer of 0 to 5; g is an integer of 1 to 6; $R^1$, $R^2$, $R^5$, $R^6$ and $R^7$ may be the same or different and are each a hydrogen atom or an alkyl group of 1 to 5 carbon atoms; $R^8$ is a hydrogen atom or an alkyl group of 1 to 5 carbon atoms; and $R^9$ is a hydrogen atom, an alkyl group of 1 to 5 carbon atoms or a group represented by $-(CH_2)_n-CR^{10}=CR^{11}R^{12}$ (n is an integer of 1 to 5, $R^{10}$ and $R^{11}$ may be the same as or different from each other and are each a hydrogen atom or an alkyl group of 1 to 5 carbon atoms, and $R^{12}$ is an alkyl group of 1 to 5 carbon atoms);

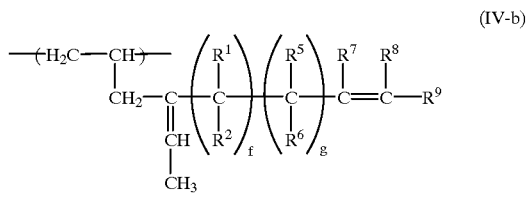
(IV-b)

wherein f, g, $R^1$, $R^2$, and $R^5$ to $R^9$ have the same meanings as in the formula (IV-a);

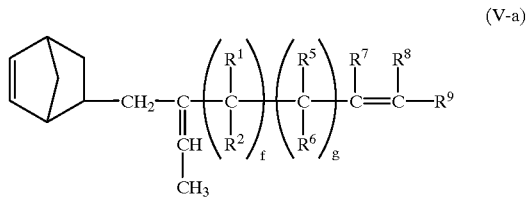
(V-a)

wherein f, g, $R^1$, $R^2$, and $R^5$ to $R^9$ have the same meanings as in the formula (IV-a);

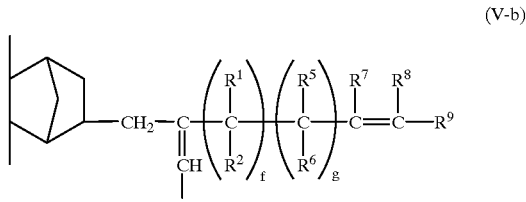
(V-b)

wherein f, g, $R^1$, $R^2$, and $R^5$ to $R^9$ have the same meanings as in the formula (IV-a).

7. The rubber composition for tire side wall according to claim 1, wherein the non-conjugated polyene (iii) is at least one non-conjugated triene or tetraene selected from compounds represented by the general formula (II-a), constituent units derived from the non-conjugated polyene being represented by the general formula (II-b):

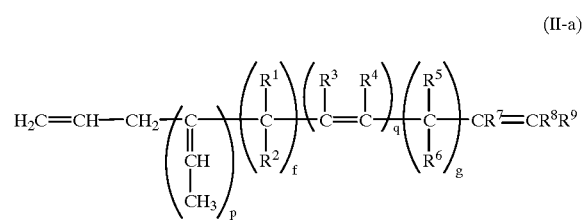
(II-a)

wherein p and q may be the same as or different from each other, and are each 0 or 1, with the proviso that each of p and q is not 0 at the same time; f is an integer of 0 to 5, with the proviso that f is not 0 when p and q are each 1; g is an integer of 1 to 6; $R^1$, $R^2$, $R^3$, $R^4$, $R^5$, $R^6$ and $R^7$ may be the same or different and are each a hydrogen atom or an alkyl group of 1 to 5 carbon atoms; $R^8$ is a hydrogen atom or an alkyl group of 1 to 5 carbon atoms; and $R^9$ is a hydrogen atom, an alkyl group of 1 to 5 carbon atoms or a group represented by —(CH$_2$)$_n$—CR$^{10}$=CR$^{11}$R$^{12}$ (n is an integer of 1 to 5, R$^{10}$ and R$^{11}$ may be the same or different and are each a hydrogen atom or an alkyl group of 1 to 5 carbon atoms, and R$^{12}$ is an alkyl group of 1 to 5 carbon atoms), with the proviso that when p and q are each 1, R$^9$ is a hydrogen atom or an alkyl group of 1 to 5 carbon atoms;

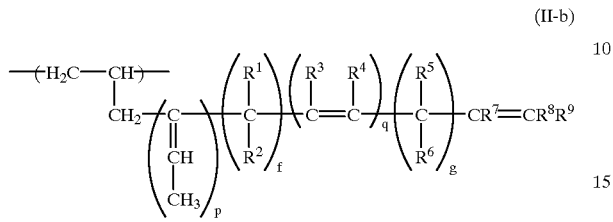

(II-b)

wherein p, q, f, g, and R$^1$ to R$^9$ have the same meanings as in the formula (II-a).

8. The rubber composition for tire side wall according to claim 7, wherein the non-conjugated triene or tetraene represented by the general formula (II-a) is at least one non-conjugated triene or tetraene selected from compounds represented by the general formula (IV-a), constituent units derived from the non-conjugated triene or tetraene being represented by the general formula (IV-b):

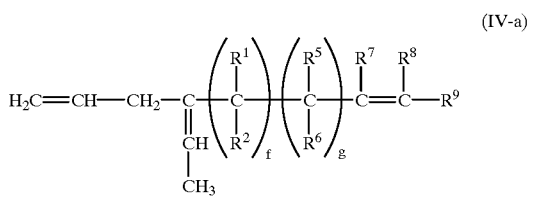

(IV-a)

wherein f is an integer of 0 to 5; g is an integer of 1 to 6; R$^1$, R$^2$, R$^5$, R$^6$ and R$^7$ may be the same or different and are each a hydrogen atom or an alkyl group of 1 to 5 carbon atoms; R$^8$ is a hydrogen atom or an alkyl group of 1 to 5 carbon atoms; and R$^9$ is a hydrogen atom, an alkyl group of 1 to 5 carbon atoms or a group represented by —(CH$_2$)$_n$—CR$^{10}$=CR$^{11}$R$^{12}$ (n is an integer of 1 to 5, R$^{10}$ and R$^{11}$ may be the same as or different from each other and are each a hydrogen atom or an alkyl group of 1 to 5 carbon atoms, and R$^{12}$ is an alkyl group of 1 to 5 carbon atoms);

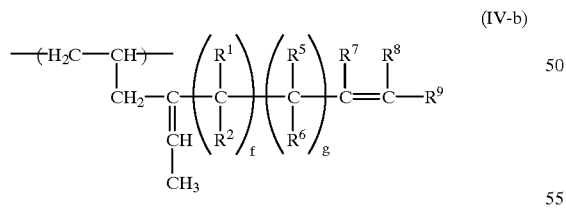

(IV-b)

wherein f, g, R$^1$, R$^2$, and R$^5$ to R$^9$ have the same meanings as in the formula (IV-a).

9. The rubber composition for the tire side wall according to claim 1, wherein the diene rubber (B) is at least one rubber selected from the group consisting of natural rubber, isoprene rubber, styrene-butadiene rubber and butadiene rubber.

10. A tire with a tire side wall comprising the rubber composition according to claim 1.

11. A tire side wall comprising the rubber composition according to claim 1.

12. A rubber composition for tire tread comprising:

(A') an unsaturated olefin copolymer prepared from
 (i) ethylene,
 (ii) an aromatic vinyl compound,
 (iii) a non-conjugated polyene, and optionally
 (iv) an α-olefin having 3 or more carbon atoms, in which the molar ratio [(i)/(iv)] of constituent units derived from ethylene (i) to constituent units derived from the α-olefin having 3 or more carbon atoms (iv) is in the range of from 100/0 to 40/60, and the molar ratio [((i)+(iv))/(ii)] of the sum of constituent units derived from ethylene (i) and constituent units derived from the α-olefin having 3 or more carbon atoms (iv) to constituent units derived from aromatic vinyl compound (ii) is in the range of from 99/1 to 85/15, and (B) a diene rubber, wherein the weight ratio [(A')/(B)] of the unsaturated olefin copolymer (A') to the diene rubber (B) is from 1/99 to 50/50.

13. The rubber composition for tire tread according to claim 12, wherein the intrinsic viscosity [η] measured in decalin at 135° C. of the unsaturated olefin copolymer (A') is from 1 to 10 dl/g.

14. The rubber composition for tire tread according to claim 12, wherein the iodine number of the unsaturated olefin copolymer (A') is from 1 to 50.

15. The rubber composition for tire tread according to claim 12, wherein the non-conjugated polyene (iii) constituting the unsaturated olefin copolymer (A') is a triene or tetraene of hydrocarbons.

16. The rubber composition for tire tread according to claim 12, wherein the non-conjugated polyene (iii) constituting the unsaturated olefin copolymer (A') is a non-conjugated triene or tetraene represented by the general formula (II-a) or (III-a):

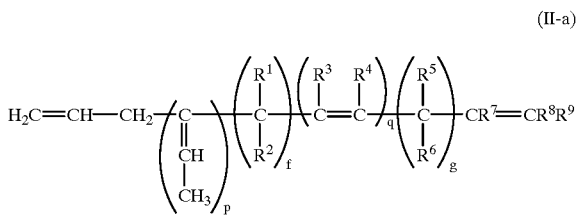

(II-a)

wherein p and q may be the same as or different from each other, and are each 0 or 1, with the proviso that each of p and q is not 0 at the same time; f is an integer of 0 to 5, with the proviso that f is not 0 when p and q are each 1; g is an integer of 1 to 6; R$^1$, R$^2$, R$^3$, R$^4$, R$^5$, R$^6$, and R$^7$ may be the same or different and are each a hydrogen atom or an alkyl group of 1 to 5 carbon atoms; R$^8$ is a hydrogen atom or an alkyl group of 1 to 5 carbon atoms; and R$^9$ is a hydrogen atom, an alkyl group of 1 to 5 carbon atoms or a group represented by —(CH$_2$)$_n$—CR$^{10}$=CR$^{11}$R$^{12}$ (n is an integer of 1 to 5, R$^{10}$ and R$^{11}$ may be the same or different and are each a hydrogen atom or an alkyl group of 1 to 5 carbon atoms, and R$^{12}$ is an alkyl group of 1 to 5 carbon atoms), with the proviso that when p and q are each 1, R$^9$ is a hydrogen atom or an alkyl group of 1 to 5 carbon atoms;

(III-a)

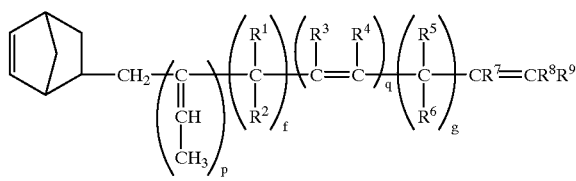

wherein p, q, f, g, and $R^1$ to $R^9$ have the same meanings as in the formula (II-a).

17. The rubber composition for tire tread according to claim 12, wherein the non-conjugated polyene (iii) constituting the unsaturated olefin copolymer (A') is a non-conjugated triene or tetraene represented by the general formula (IV-a) or (V-a):

(IV-a)

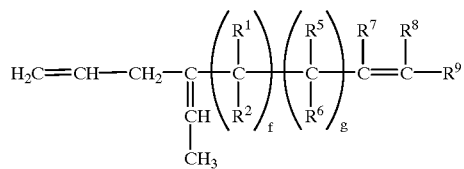

wherein f is an integer of 0 to 5; g is an integer of 1 to 6; $R^1$, $R^2$, $R^5$, $R^6$ and $R^7$ may be the same or different and are each a hydrogen atom or an alkyl group of 1 to 5 carbon atoms; $R^8$ is a hydrogen atom or an alkyl group of 1 to 5 carbon atoms; and $R^9$ is a hydrogen atom, an alkyl group of 1 to 5 carbon atoms or a group represented by $-(CH_2)_n-$ $CR^{10}=CR^{11}R^{12}$ (n is an integer of 1 to 5, $R^{10}$ and $R^{11}$ may be the same as or different from each other and are each a hydrogen atom or an alkyl group of 1 to 5 carbon atoms, and $R^{12}$ is an alkyl group of 1 to 5 carbon atoms);

(V-a)

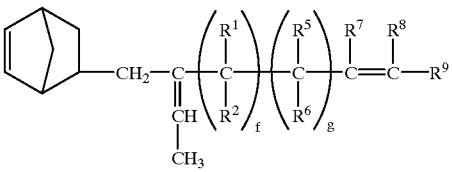

wherein f, g, $R^1$, $R^2$, and $R^5$ to $R^9$ have the same meanings as in the formula (IV-a).

18. The rubber composition for tire tread according to claim 15, wherein the non-conjugated triene or tetraene is a non-conjugated triene or tetraene having a total of 9 or more hydrogen atoms directly bonded to all the carbon atoms adjacent to all the carbon—carbon double bonds in one molecule.

19. The rubber composition for tire tread according to claim 12, wherein the diene rubber (B) is natural rubber, isoprene rubber, styrene/butadiene copolymer rubber, butadiene rubber or a mixture thereof.

20. A tire with a tire tread comprising the rubber composition according to claim 12.

21. A tire tread comprising the rubber composition according to claim 12.

\* \* \* \* \*